United States Patent
Hayashi et al.

(10) Patent No.: US 7,281,175 B1
(45) Date of Patent: Oct. 9, 2007

(54) READOUT CONTROLLING APPARATUS, REPRODUCING APPARATUS, RECORDING APPARATUS, AND READOUT CONTROLLING METHOD

(75) Inventors: Tsuneo Hayashi, Chiba (JP); Kazuhiro Yasuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/503,140

(22) Filed: Feb. 11, 2000

(30) Foreign Application Priority Data

Feb. 26, 1999 (JP) ............................... P11-051796

(51) Int. Cl.
*G06F 11/00* (2006.01)
(52) U.S. Cl. ..................... 714/704; 714/707; 714/708
(58) Field of Classification Search ................ 714/704, 714/707, 708
See application file for complete search history.

(56) References Cited

U.S. PATENT DOCUMENTS

| | | | | |
|---|---|---|---|---|
| 4,375,100 A * | 2/1983 | Tsuji et al. | .................. | 714/755 |
| 4,755,980 A * | 7/1988 | Yoshimaru et al. | ...... | 369/47.52 |
| 5,034,939 A * | 7/1991 | Kurz et al. | .............. | 369/44.32 |
| 5,233,487 A * | 8/1993 | Christensen et al. | ..... | 360/77.04 |
| 5,237,588 A * | 8/1993 | Tanaka et al. | .............. | 375/230 |
| 5,325,371 A * | 6/1994 | Maeda et al. | ................ | 714/756 |
| 5,392,273 A * | 2/1995 | Masaki et al. | ............... | 369/106 |
| 5,406,429 A * | 4/1995 | Noguchi et al. | .............. | 360/65 |
| 5,408,367 A * | 4/1995 | Emo | .......................... | 360/53 |
| 5,471,457 A * | 11/1995 | Bakx et al. | .............. | 369/47.53 |
| 5,610,776 A * | 3/1997 | Oh | ............................... | 360/53 |
| 5,687,036 A * | 11/1997 | Kassab | ........................ | 360/53 |
| 5,687,182 A * | 11/1997 | Shikakura | .................... | 714/774 |
| 5,696,774 A * | 12/1997 | Inoue et al. | ................ | 714/755 |
| 5,721,873 A * | 2/1998 | Tobita et al. | ............... | 711/164 |
| 5,764,651 A * | 6/1998 | Bullock et al. | ............. | 714/708 |
| 5,774,285 A * | 6/1998 | Kassab et al. | ................ | 360/31 |
| 5,784,356 A * | 7/1998 | Hayashi et al. | .......... | 369/47.25 |
| 5,862,111 A * | 1/1999 | Arai | ........................ | 369/44.36 |
| 5,930,448 A * | 7/1999 | Lee et al. | ..................... | 386/78 |
| 6,216,245 B1 * | 4/2001 | Noda | .......................... | 714/755 |
| 6,240,055 B1 * | 5/2001 | Takamine et al. | ........ | 369/44.29 |
| 6,246,041 B1 * | 6/2001 | Nakayama et al. | ...... | 250/201.5 |
| 6,252,731 B1 * | 6/2001 | Sloan et al. | ................... | 360/31 |
| 6,381,088 B1 * | 4/2002 | Despain et al. | .......... | 360/77.06 |
| 6,392,970 B1 * | 5/2002 | Fuji et al. | ................... | 369/47.5 |
| 6,397,369 B1 * | 5/2002 | Despain et al. | ............. | 714/798 |
| 6,400,523 B1 * | 6/2002 | Katayama et al. | ....... | 360/77.04 |
| 6,411,592 B1 * | 6/2002 | Nishiuchi et al. | ........ | 369/275.4 |
| 6,434,106 B1 * | 8/2002 | Ohtsuka | ..................... | 369/116 |
| 6,483,658 B1 * | 11/2002 | Nguyen | .................. | 360/77.01 |

FOREIGN PATENT DOCUMENTS

| | | | |
|---|---|---|---|
| JP | 61211840 A | * | 9/1986 |
| JP | 08297849 A | * | 11/1996 |

* cited by examiner

*Primary Examiner*—Joseph D. Torres
(74) *Attorney, Agent, or Firm*—Robert J. Depke; Rockey, Depke & Lyons, LLC.

(57) ABSTRACT

A readout controlling apparatus for controlling reading conditions at the time of reading data coded in units of predetermined code blocks from a recording medium capable of performing error correction at a high reliability even when the playback conditions are poor by calculating an error rate using the number of bytes for which outer code error correction has been completed etc. in the error correction in an error corrector and controlling the reading conditions so that the error rate becomes small.

16 Claims, 14 Drawing Sheets

READOUT CONTROLLING APPARATUS, REPRODUCING APPARATUS, RECORDING APPARATUS, AND READOUT CONTROLLING METHOD

BACKGROUND OF THE INVENTION

1. Field of the Invention

The present invention relates to a readout controlling apparatus, player, and recorder of a digital disk or other recording media and a readout controlling method.

2. Description of the Related Art

When playing back a digital versatile disk (DVD), a DVD player etc. converts an analog signal read from the DVD to a digital signal and applies 8 to 16 demodulation to the digital signal. It then stores one error correcting code (ECC) block's worth of the digital signal obtained by the 8 to 16 demodulation in a buffer memory, then reads this out, corrects its errors, and decodes the error corrected digital signal.

Here, the error correction is performed in units of ECC blocks on the digital signal read from the DVD.

FIG. 1 is a view for explaining the format of an ECC block.

$B_{M,N}$ ($0 \leq M \leq 192$, $0 \leq N \leq 171$) shown in FIG. 1 is information data composed of 16 sectors each comprised by 172 bytes times 12 rows.

$B_{M,N}$ ($0 \leq M \leq 207$, $172 \leq N \leq 181$) is an inner code parity of the Reed-Solomon code.

Namely, the inner code parity $B_{M,N}$ ($172 \leq N \leq 181$) is an inner code parity of the information data $B_{M,N}$ ($0 \leq N \leq 171$).

Also, $B_{M,N}$ ($192 \leq M \leq 207$, $0 \leq N \leq 171$) is an outer code parity of the Reed-Solomon code.

Namely, the outer code parity $B_{M,N}$ ($192 \leq M \leq 207$) is an outer code parity of the information data $B_{M,N}$ ($0 \leq M \leq 192$).

In the above error correction, outer code error correction is performed in units of code blocks corresponding to the columns shown in FIG. 1, while inner code error correction is performed in units of code blocks corresponding to the rows shown in FIG. 1.

In this case, in error correction performed in units of code blocks, the number of bytes able to be corrected for error is determined in accordance with the number of bytes of the parity.

Accordingly, when the playback condition of a DVD is poor and more than a predetermined number of bytes include error, there is a disadvantage that there are bytes unable to be corrected for error and therefore quality of a digital signal reproduced deteriorates.

Also when recording a digital signal in a DVD, if the recording condition is poor, there is a disadvantage that the quality of the digital signal recorded on the DVD deteriorates.

SUMMARY OF THE INVENTION

An object of the present invention is to provide a readout controlling apparatus capable of reading data from recording media with a good quality and a method of the same.

Another object of the present invention is to provide a player capable of reproducing data from recording media in a good condition.

Still another object of the present invention is to provide a recorder capable of recording data to a recording media well.

To achieve the first object, according to a first aspect of the present invention, there is provided a readout controlling apparatus for controlling reading conditions at the time of reading data from a recording medium, comprising an error correcting means for correcting error of the read data; an error rate calculating means for calculating an error rate of the error correction; and a control means for controlling the reading conditions in order to make the error rate small.

That is, in the readout controlling apparatus of the present invention, data read from a recording medium is corrected for error in the error correcting means. Then, the error rate of the error correction is calculated in the error rate calculating means. The reading condition is controlled by the control means so that the error rate becomes small.

Preferably, the data is coded in units of predetermined code blocks; the error correcting means corrects the error in units of the code blocks; and the error rate calculating means calculates the error rate by using at least one of the number of bytes of data where the error correction was correctly carried out, the number of bytes of data wherein the error correction was not correctly carried out, the number of code blocks wherein the error correction was correctly carried out, and the number of blocks wherein the error correction was not correctly carried out.

Preferably, the error rate calculating means calculates the error rate by using results of cumulative addition of at least one of the number of bytes of data wherein the error correction was correctly carried out, the number of bytes of data wherein the error correction was not correctly carried out, the number of code blocks wherein the error correction was correctly carried out, and the number of blocks wherein the error correction was not correctly carried out for at least one code block.

More preferably, the readout controlling apparatus further comprises a cumulative code block number control means for controlling the cumulative number of the code blocks.

Preferably, the data comprises the information data arranged in a two dimensional plane of row and column directions, an inner code parity indicating an error correction code in the row direction of every column, an outer code parity indicating an error correction code in the column direction of every row, and the information data and the error correcting means performs inner code error correction using the inner code parity and outer code error correction using the outer code parity.

More preferably, the readout controlling apparatus further comprises at least one first storage means for storing the results of cumulative addition of the inner code error corrections and at least one second storage means for storing the results of cumulative addition of the outer code error corrections.

Still more preferably, the error rate calculating means reads the results of cumulative addition stored in the first storage means and the second storage means in a predetermined order.

Still further preferably, the first storage means and the second storage means are connected in series so that data stored in former stages can be successively output to latter stages; and the error rate calculating means accesses one of the storage means of the first storage means and the second storage means.

Preferably, the recording medium is an optical disk; and the control means controls at least one of an amount of light of a laser diode, a frequency of a signal superimposed on a signal applied to a laser diode, an amplitude of the signal superimposed on the signal applied to a laser diode, a gain of a photodiode, filter characteristics, focus conditions, tracking conditions, RF signal characteristics, an inclination of the optical disk, and a speed of the optical disk.

According to a second aspect of the invention, there is a player, comprising a reproducing means for reproducing data from a recording medium; an error correcting means for correcting error of the reproduced data; an error rate calculating means for calculating an error rate of the error correction; and a control means for controlling reproduction conditions of the reproducing means so that the error rate becomes small.

According to a third aspect of the present invention, there is provided a recorder, comprising a recording means for recording data on a recording medium; a reading means for reading the recorded data; an error correcting means for correcting error of the read data; an error rate calculating means for calculating an error rate of the error correction; and a control means for controlling recording conditions of the recording means so that the error rate becomes small.

According to a fourth aspect of the present invention, there is provided a readout controlling method for controlling reading conditions at the time of reading data from a recording medium including the steps of correcting error of the read data; calculating an error rate of the error correction; and controlling the reading conditions so that the error rate becomes small.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

First Embodiment

Figure 2:
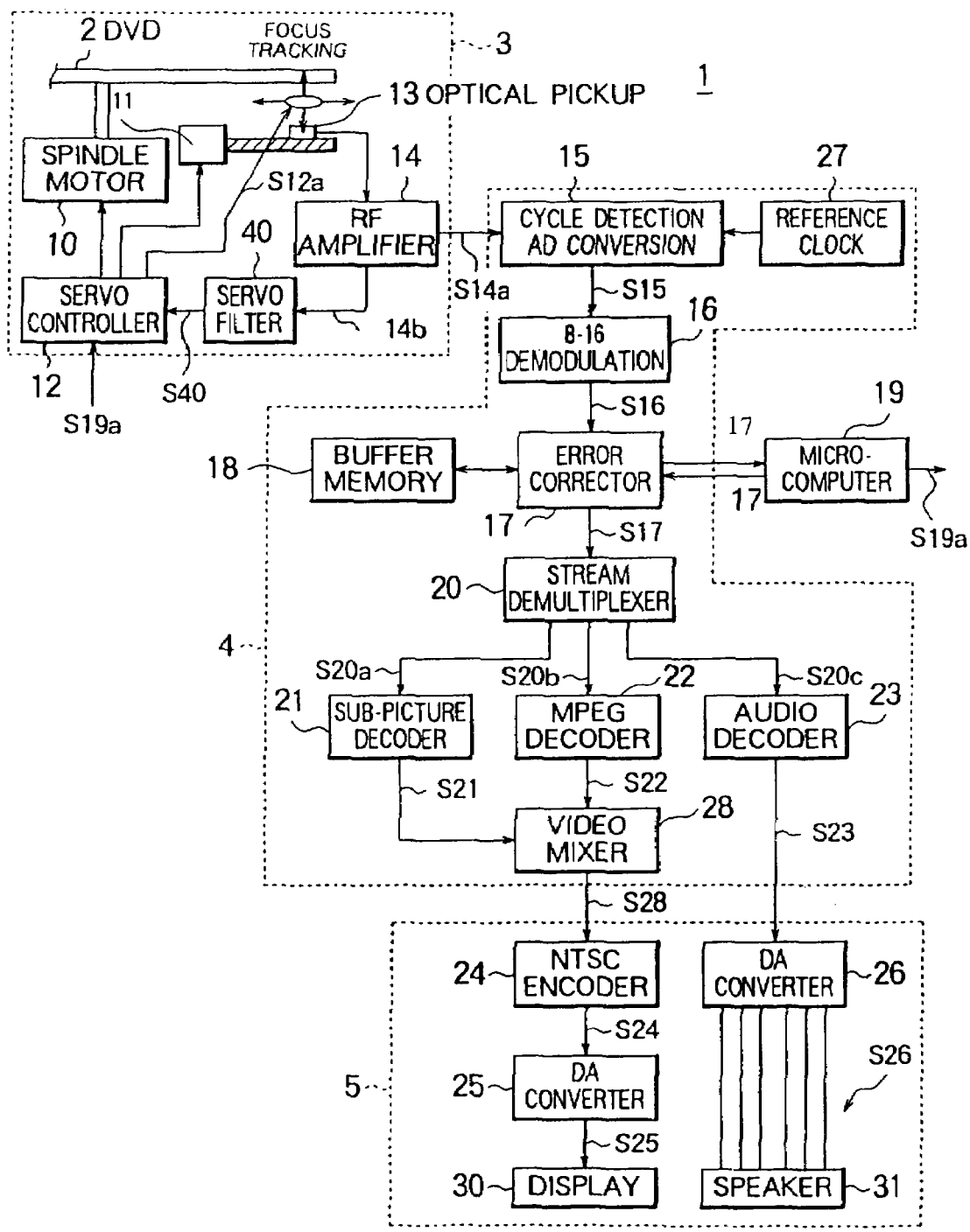
FIG. 2 is a view of the configuration of a DVD player according to a first embodiment of the present invention.

FIG. 2 is a view of the configuration of a DVD player according to a first embodiment of the present invention.

As shown in FIG. 2, the DVD player 1 comprises a reading system 3, a decoding system 4, an output system 5, and a microcomputer 19.

The DVD player 1 calculates an error rate at the microcomputer 19 based on error correction results in an error corrector 17 and controls a focus servomechanism in an optical pickup 13 based on the error rate.

[Reading System 3]

The reading system 3 comprises a spindle motor 10, a feed motor 11, a servo controller 12, the optical pickup 13, an RF amplifier 14, and a servo filter 40.

The servo controller 12 controls the spindle motor 10, feed motor 11, and optical pickup 13.

For example, the servo controller 12 generates a focus servo signal based on a parameter instruction signal S19a from the microcomputer 19 and a focus error signal S40 from a servo filter 40 and outputs the generated focus servo signal S12a to the optical pickup 13.

Specifically, the servo controller 12 generates a new focus error signal by giving an offset indicated by the parameter instruction signal S19a to the focus error signal S40 and generates the focus servo signal S12a based on the newly generated focus error signal.

The spindle motor 10 drives rotation of a DVD 2 under the control of the servo controller 12.

The servo filter 40 filters a focus error signal 14b from the RF amplifier 14 by predetermined filter characteristics and outputs the filtered focus error signal S40 to the servo controller 12.

Note that for example a digital filter of a digital signal processor (DSP) is used as the servo filter 40.

The feed motor 11 drives movement of the optical pickup 13 in the diameter direction of the DVD 2 under control of the servo controller 12.

The optical pickup 13 emits laser light to the surface of the DVD 2 via an object lens, receives the reflected light, and outputs a read signal in accordance with results of the received light to the RF amplifier 14.

Also, the optical pickup 13 performs focus control on the focus servo signal S12a from the servo controller 12.

The RF amplifier 14 amplifies the read signal from the optical pickup 13 and outputs the same as an RF signal S14a to an AD converter 15.

Further, the RF amplifier 14 outputs a focus error signal S14b generated based on the read signal from the optical pickup 13 to the servo filter 40.

[Decoding System 4]

The decoding system 4 comprises an AD converter 15, an 8 to 16 demodulator 16, an error corrector 17, a buffer memory 18, a stream demultiplexer 20, a sub-picture decoder 21, a Moving Picture Experts Group (MPEG) decoder 22, an audio decoder 23, a reference clock generator 27, and a video mixer 28.

The AD converter 15 converts an analog RF signal S14a to a digital reproduction signal S15 based on a reference clock signal from the reference clock generator 27 and outputs this to the 8 to 16 demodulator 16.

The 8 to 16 demodulator 16 generates a reproduction signal S16 by demodulating an 8-bit pattern included in the reproduction signal S15 to a 16-bit pattern and outputs the same to the error corrector 17.

The buffer memory 18 has a memory capacity for storing at least one error correction code block's, that is, ECC block's, worth of the reproduction signal S16 from the 8 to 16 demodulator 16 and outputs the stored reproduction signal to the error corrector 17 under control by the microcomputer 19.

The stream demultiplexer 20 demultiplexes a sub-picture signal S20*a*, a video signal S20*b*, and an audio signal S20*c* from the reproduction signal S17 and outputs them to the sub-picture decoder 21, the MEG decoder 22, and the audio decoder 23, respectively.

The sub-picture decoder 21 decodes the sub-picture signal S20*a* and outputs the decoded sub-picture signal S21 to the video mixer 28.

The MEG decoder 22 decodes the video signal S20*b* by the MEG system and outputs the decoded video signal S22 to the video mixer 28.

The audio decoder 23 decodes the audio signal S20*c* and outputs a decoded audio signal S23 to a DA converter 26.

The video mixer 28 mixes the sub-picture signal S21 with the video signal S22 to generate a video signal S28 and outputs the same to a National Television System Committee (NTSC) encoder 24.

Figure 1:
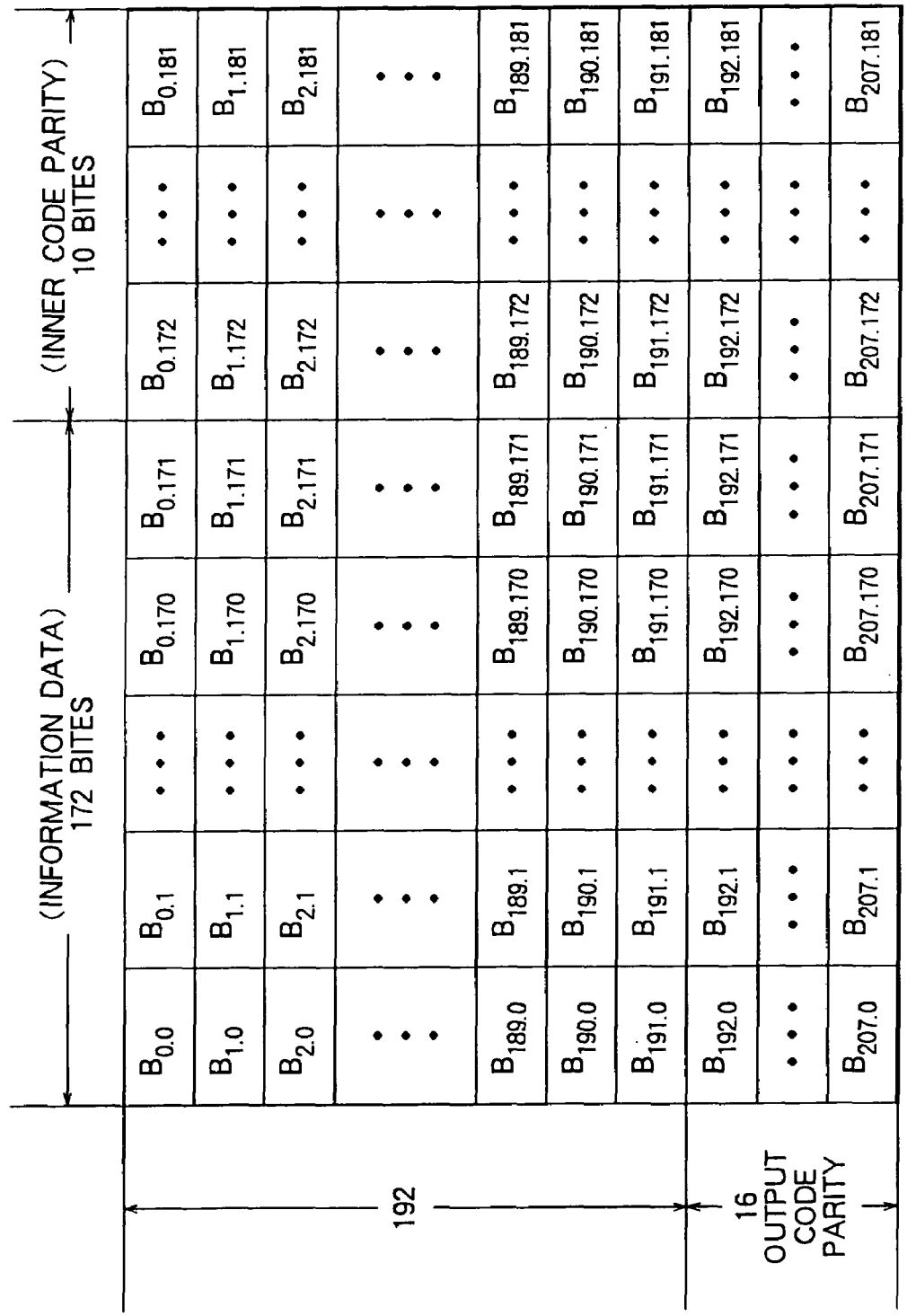
FIG. 1 is a view for explaining the format of an ECC block.

The error corrector 17 performs inner code error correction and outer code error correction on the reproduction signal read from the buffer memory 18 in units of ECC blocks shown in FIG. 1 and outputs the corrected reproduction signal S17 to the stream demultiplexer 20. As an error correction code, for example, a Reed-Solomon code is used.

The error corrector 17 will be explained in detail below.

Figure 3:
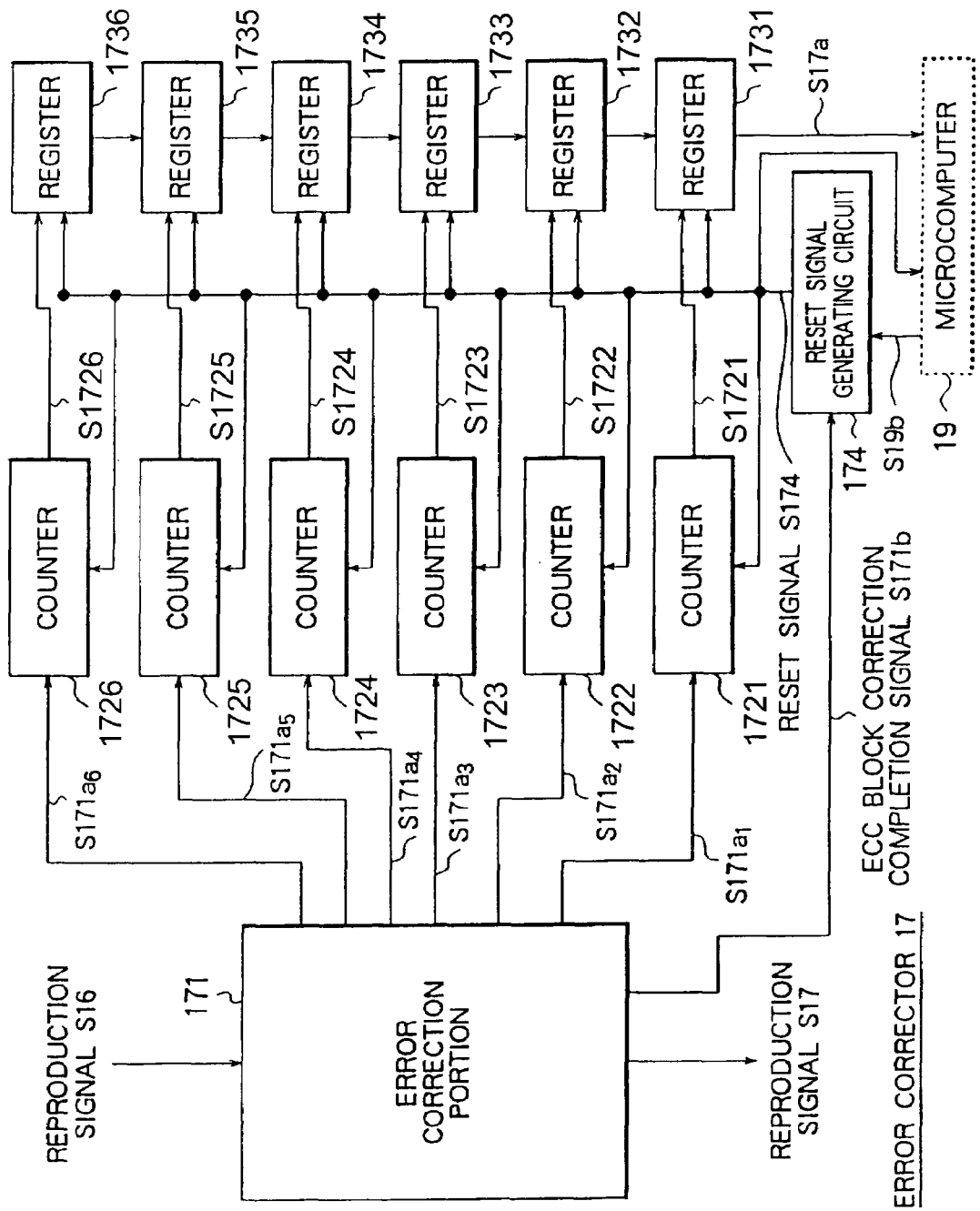
FIG. 3 is a view of the configuration of an error corrector shown in FIG. 2.

FIG. 3 is a view of the configuration of the error corrector 17.

As shown in FIG. 3, the error corrector 17 comprises an error correction portion 171, counters 1721 to 1726, registers 1731 to 1736, and a reset signal generation circuit 174.

<Error Correction Portion 171>

First, processing of the error correction portion 171 will be explained.

Figure 4:
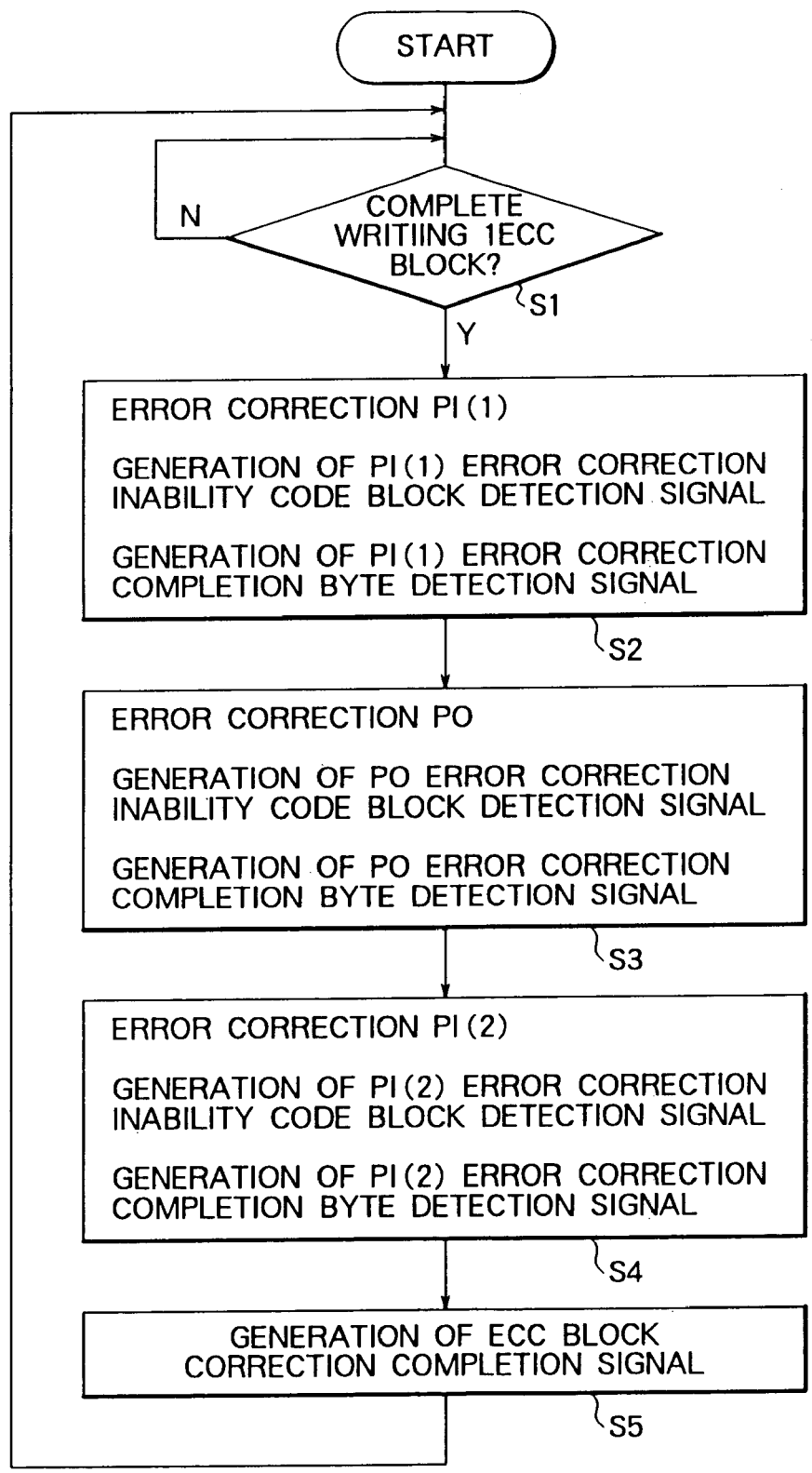
FIG. 4 is a flow chart of the processing of an error correction portion shown in FIG. 3.

FIG. 4 is a flow chart of the processing of the error correction portion 171.

Step S1: The error correction portion 171 judges whether or not one ECC block's worth of the reproduction signal S16 shown in FIG. 1 has been written in the buffer memory 18 shown in FIG. 2. When judged it is written, the processing of Step S2 is performed, while when not, the processing of Step S1 is repeated.

Step S2: The error correction portion 171 reads the data B0,0 to B207,181 shown in FIG. 1 from the buffer memory 18 in units of PI code blocks comprised by data B0, M to B207, M ($0 \leq M \leq 181$) as units of error correction using an inner code parity and performs first inner code error correction in units of the PI code blocks.

Specifically, the data B0,0 to B207,0 is read from the buffer memory 18 first and then the data B0,1 to B207,1 is read. Then, data is read in units of PI code blocks in the order of the data B0,2 to B207,2, data B0,3 to B207,3, . . . , data B0,181 to B207,181 so that the inner code error correction is performed.

The error correction portion 171 detects in units of bytes whether or not the inner code error correction was correctly performed at the time of the first inner code error correction, generates an error correction completion byte detection signal S171*a*1 which generates a pulse every time the fact that the inner code error correction was correctly performed was detected, and outputs the same to the counter 1721.

Further, the error correction portion 171 detects a PI code block wherein the inner code error correction was not correctly performed at the time of performing the first inner code error correction, generates a PI(1) error correction inability code block detection signal S171*a*2 every time such a PI code block is detected, and outputs the same to the counter 1722.

Step S3: The error correction portion 171 reads the data B0,0 to B207,181 shown in FIG. 1 from the buffer memory 18 in units of PO code blocks comprised by the data BN,0 to BN,181 ($0 \leq N \leq 207$) as units of error correction using an outer code parity and performs outer code error correction in units of PO code blocks.

Specifically, the data B0,0 to B0,181 is read from the buffer memory 18 first, and then data B1,0 to B1,181 is read next. Then, data is read in units of PO code blocks in the order of the data B2,0 to B2,181, data B3,0 to B3,181, . . . , data B207,0 to B207,181 so as to perform the outer code error correction.

The error correction portion 171 detects in units of bytes whether or not the outer code error correction was correctly performed at the time of performing the outer code error correction, generates a PO error correction completion byte detection signal S171*a*3 which generates a pulse every time the fact that the outer code error correction was correctly performed was detected, and outputs the same to the counter 1723.

Further, the error correction portion 171 detects a PO code block wherein the outer code error correction was not correctly performed at the time of performing the outer code error correction, generates a PO error correction inability code block detection signal S171*a*4 every time the PO code block is detected, and outputs the same to the counter 1724.

Step S4: The error correction portion 171 reads the data B0,0 to B207,181 shown in FIG. 1 from the buffer memory 18 in units of PI code blocks comprised by data B0,M to B207,M ($0 \leq M \leq 181$) as units of error correction using an inner code parity and performs second inner code error correction in units of PI code blocks.

Specifically, the data B0,0 to B207,0 is read from the buffer memory 18 first and then the data B0,1 to B207,1 is read. Then, data is read in units of PI code blocks in the order of the data B0,2 to B207,2, data B0,3 to B207,3, . . . , data B0,181 to B207,181 so that the second inner code error correction is performed.

The error correction portion 171 detects in units of bytes whether or not the inner code error correction was correctly performed at the time of the second inner code error correction, generates a PI(2) error correction completion byte detection signal S171*a*5 which generates a pulse every time the fact that the inner code error correction was correctly performed was detected, and outputs the same to the counter 1725.

Further, the error correction portion 171 detects a PI code block wherein the inner code error correction was not correctly performed at the time of performing the second inner code error correction, generates a PI(2) error correction inability code block detection signal S171*a*6 every time the PI code block is detected, and outputs the same to the counter 1726.

Step S5: The error correction portion 171 generates a pulse in an ECC block correction completion signal S171*b* output to the reset signal generation circuit 174.

<Counters 1721 to 1726>

The counter 1721 counts the pulses included in the PI(1) error correction completion byte detection signal S171a1 and outputs the count to the register 1731 as a PI(1) error correction completed byte number instruction signal S1721.

The counter 1722 counts the pulses included in the PI(1) error correction inability code block detection signal S171a2 and outputs the count to the register 1732 as a PI(1) error correction inability code block number instruction signal S1722.

The counter 1723 counts the pulses included in the PO error correction completion byte detection signal S171a3 and outputs the count to the register 1733 as a PO error correction completion byte number instruction signal S1723.

The counter 1724 counts the pulses included in the PO error correction inability code block detection signal S171a4 and outputs the count to the register 1734 as a PO error correction inability code block number instruction signal S1724.

The counter 1725 counts the pulses included in the PI(2) error correction completion byte detection signal S171a5 and outputs the count to the register 1735 as a PI(2) error correction completion byte number instruction signal S1725.

The counter 1726 counts the pulses included in the PI(2) error correction inability code block detection signal S171a6 and outputs the count to the register 1736 as a PI(2) error correction inability code block number instruction signal S1726.

Here, the counters 1721 to 1726 reset their counts to zero when a pulse is generated in a reset signal S174.

<Reset Signal Generation Circuit 174>

The reset signal generation circuit 174 counts the pulses including in the ECC block correction completion signal S171b and, when the count has reached a predetermined value, generates a pulse in the reset signal S174 to reset the count. The reset signal generation circuit 174 outputs the reset signal S174 to the counters 1721 to 1726, the registers 1731 to 1736, and microcomputer 19.

Note that the predetermined value shows the number of ECC blocks cumulatively added by the counters 1721 to 1726 and is set by a setting signal S19b from the microcomputer 19. In this embodiment, it is for example "1".

<Registers 1731 to 1736>

The registers 1731 to 1736 are connected in series so that the stored data in the final register 1731 is output to the microcomputer 19. At this time, the data output from the register 1731 to the microcomputer 19 becomes an error correction evaluation signal S17a.

The registers 1731 to 1736 output the stored data to the succeeding registers and store data input from the preceding registers every time a pulse is generated in the reset signal S174.

The register 1731 stores the PI(1) error correction completion byte number instruction signal S1721 input from the counter 1721.

The register 1732 stores the PI(1) error correction inability code block number instruction signal S1722 input from the counter 1722.

The register 1733 stores the PO error correction completion byte number instruction signal S1723 input from the counter 1723.

The register 1734 stores the PO error correction inability code block number instruction signal S1724 input from the counter 1724.

The register 1735 stores the PI(2) error correction completion byte number instruction signal S1725 input from the counter 1725.

The register 1735 stores the PI(2) error correction inability code block number instruction signal S1725 input from the counter 1725.

<Output System 5>

The output system 5 comprises an NTSC encoder 24, a DA converters 25 and 26, and speakers 31.

The NTSC encoder 24 decodes the video signal S28 by the NTSC system and outputs a decoded video signal S24 to the DA converter 25.

The DA converter 25 converts the video signal S24 to an analog video signal S25 and outputs the same to a display 30.

The DA converter 26 converts the digital audio signal S23 to an analog audio signal S26 and outputs the same to speakers 31.

<Microcomputer 19>

The microcomputer 19 generates an error rate by using the error correction evaluation signal S17a from the error corrector 17, determines a bias of a focus error signal in order to suppress defocus based on the generated error rate, and generates a parameter instruction signal indicating the bias.

Below, a method of calculation of the error rate in the microcomputer 19 will be explained.

Here, when the PI(1) error correction completion byte number instruction signal S1721, the PI(1) error correction inability code block number instruction signal S1722, the PO error correction completion byte number instruction signal S1723, the PO error correction inability code block number instruction signal S1724, the PI(2) error correction completion byte number instruction signal S1725, and the PI(2) error correction inability coding number instruction signal S1725 are respectively a, b, c, d, e, and f, the error rate ER is represented, for example, by the equation (1) below.

$$ER=\{(a+c+e)/(\text{number of bytes included in 1 } EEC \text{ block} \times 3)\} \times 1/5 + \{d/(\text{number of } PO \text{ code blocks}) + (b+f)/(\text{number of } PI \text{ code blocks} \times 2)\} \times 4/5 \quad (1)$$

Namely, in equation (1), the error rate ER is calculated by using both of the number of bytes for which error correction was completed and the number of code blocks for which error correction was not possible in one outer code error correction and two inner code error corrections and larger weight is given to the number of code blocks for which error correction was not possible compared with the number of bytes for which error correction was completed.

A method of generating a parameter instruction signal S19a in the microcomputer 19 will be explained below.

The parameter instruction signal indicates the bias to be given to the focus error signal as explained above. The bias is generated by using the parameter error signal.

Here, the parameter error signal is the difference from an optimal value of the bias.

Figure 5:
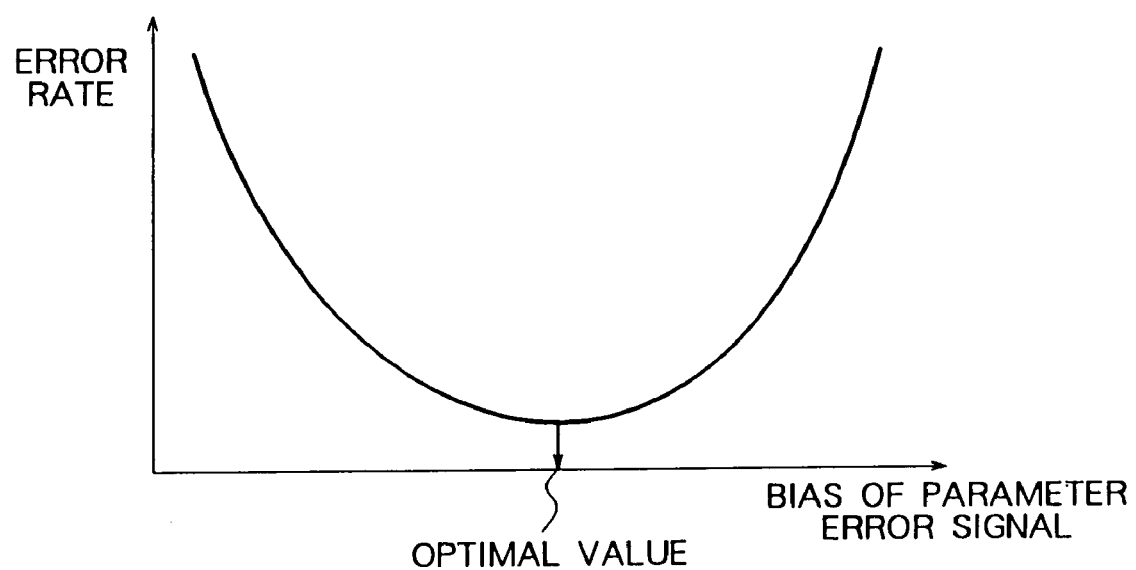
FIG. 5 is a view of the relationship of a bias and an error rate of a parameter error signal.

Note that the optimal value of the bias is, as shown in FIG. 5, a bias value by which the error rate becomes the smallest.

First, a method of generating the parameter error signal in the microcomputer 19 will be explained.

Figure 6:
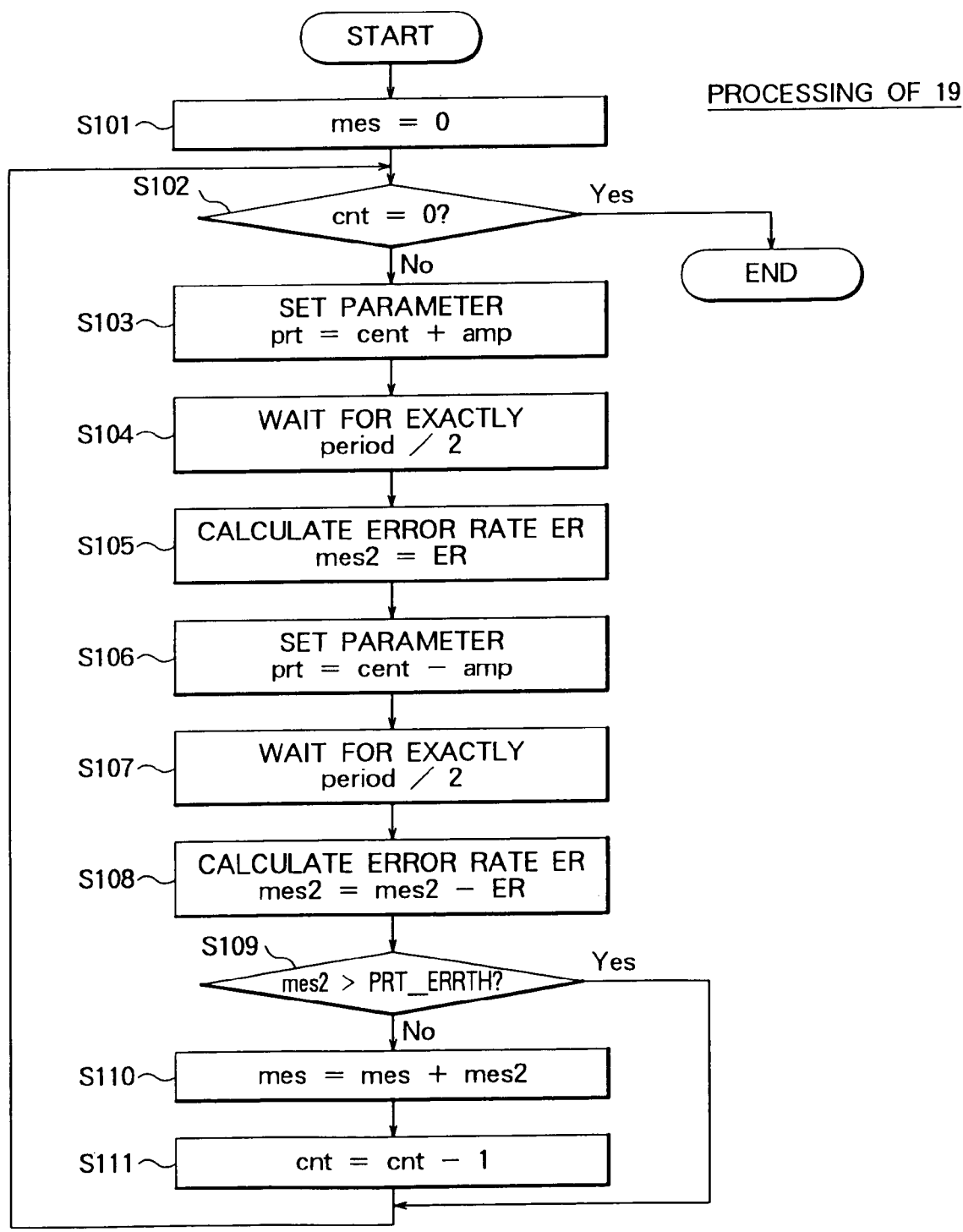
FIG. 6 is a flow chart of generation of a parameter instruction signal in a microcomputer shown in FIG. 2.

FIG. 6 is a flow chart for generation of the parameter error signal in the microcomputer 19.

A parameter "prt" is determined by adding or subtracting an amplitude value "amp" to or from a central value "cent". The time from changing the parameter until fetching the error rate shown as "period". Further, the cumulative value of the parameter error signal is shown as "mes". The number of cumulative additions of the parameter signal is shown as "cnt".

Step S101: The microcomputer 19 sets the cumulative value "mes" of the parameter signal to an initial value of 0.

Step S102: The microcomputer 19 judges whether the number of cumulative additions "cnt" is 0 or not. When it is 0, it ends the processing, while when it is not, carries out the processing of Step S103.

Step S103: The microcomputer 19 adds an amplitude value "amp" to a central value "cent" and assigns the added result to the parameter "prt".

Step S104: The microcomputer 19 waits for exactly a time of "period"/2.

Step S105: The microcomputer 19 uses the error correction evaluation signal S17a input from the register 1731 shown in FIG. 3 to calculate the error rate ER based on the above equation (1) and inserts the error rate ER for the variable "mes2".

Step S106: The microcomputer 19 subtracts the amplitude value "amp" from the central value "cent" and inserts the subtracted result for the parameter "prt".

Step S107: The microcomputer 19 waits for exactly a time of "period"/2.

Step S108: The microcomputer 19 uses the error correction evaluation signal S18a input from the register 1731 shown in FIG. 3 to calculate the error rate ER based on the above equation (1), subtracts the error rate ER from the variable "mes2", and inserts the subtracted result for the variable "mes2".

At this time, the value indicated by the variable "mes2" is the value of a parameter signal cumulatively added once.

Step S109: The microcomputer 19 judges whether or not the variable "mes2" obtained at step S108 is larger than a predetermined value "PRT_ERRTH". When judged to be larger, it returns to the processing of Step S102, while when judged smaller, it carries out the processing of Step S110.

Here, the variable "mes2" becomes under the predetermined value "PRT_ERRTH" under normal measurement conditions, however, when there are scratches, dirt, etc. on the surface of the DVD 2, it becomes over the predetermined value "PRT_ERRTH" in some cases. Therefore, a variable "mes2" not less than the predetermined value "PRT_ER-RTH" is judged to be incorrect data, and the value of the variable "mes2" is not added to the cumulative value "mes" of the parameter error signal. That is, it is discarded.

Step S110: The microcomputer 19 adds the value of the variable "mes2" obtained at Step S108 to the cumulative value "mes" of the parameter signal and makes the added result the cumulative value "mes".

Step S111: The microcomputer 19 decreases the number of cumulative additions "cnt" of the parameter signal by exactly 1.

Namely, in the processing shown in FIG. 6, when the variable "mes2", which shows the error rate in a case where the parameter "prt" is "cent+amp" minus the error rate ER in a case where the parameter "prt" is "cent-amp", is less than the predetermined value "PRT_ERRTH", the variable "mes2" is added to the cumulative value "mes" of the parameter error signal (namely, the variable "mes2" is used for cumulative addition), and the cumulative value "mes" after addition the number of times shown in "cnt" is made the finally obtained parameter error signal.

Here, the processing loop from the above Step S102 to Step S111 means to multiply and extract a square wave.

For example, suppose there is a sample data row of "d1, d2, d3, d4, . . . , ". If a square wave is multiplied with this, it becomes "d1, −d2, d3, −d4, . . . " Further, when it is cumulatively added, the cumulative value "sum" becomes as in equation (2) below.

$$\text{sum} = \sum_{i=2}^{n} (d(i-1) - di) \quad (2)$$

Here, "sum" in equation (2) corresponds to the cumulative value "mes" in FIG. 6, and (d(i−1)−di) corresponds to the variable "mes2" in FIG. 6.

A method of cumulative addition by multiplying with a square wave was explained above, however, a sinusoidal wave etc. may be multiplied for cumulative addition as well.

Next, a method of generating a parameter instruction signal by feeding back the parameter error signal generated by the processing shown in FIG. 6 in the microcomputer 19 will be explained next.

Figure 7:
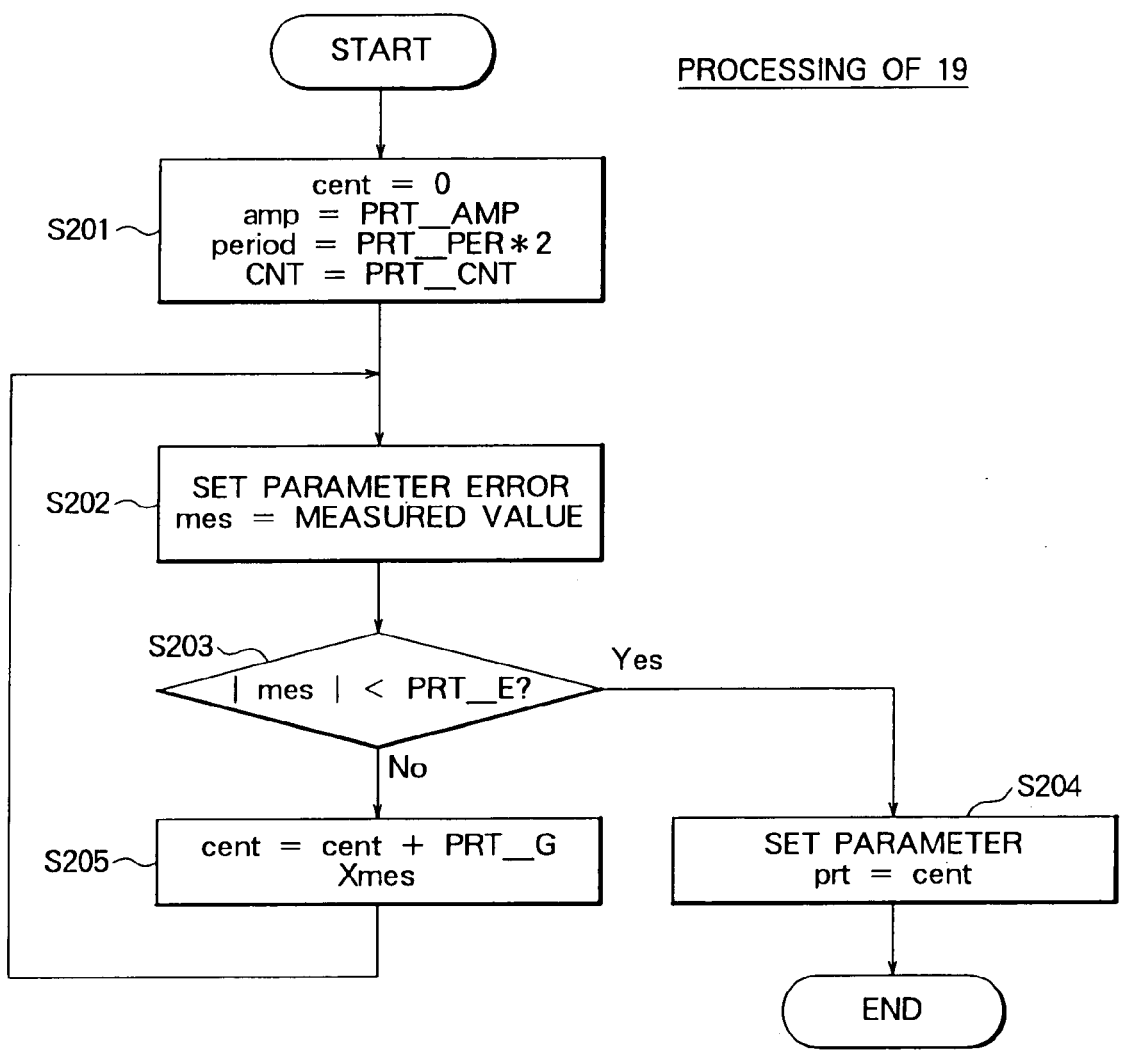
FIG. 7 is a flow chart of a method of generating a parameter instruction signal in the microcomputer shown in FIG. 2.

FIG. 7 is a flow chart of a method of generating a parameter instruction signal in the microcomputer 19.

Step S201

The microcomputer 19 performs the initialization. Specifically, a central value "cent" of the parameter is set to 0, an amplitude value "amp" is set to "PRT_AMP", "period" is set to two times "PRT_PER" of a ½ modulation cycle, and "cnt" is set to "PRT_CNT".

Step S202

The microcomputer 19 performs processing based on FIG. 6 and generates a parameter error signal "mes".

Step S203

The microcomputer 19 compares an absolute value of the parameter error signal "mes" obtained at Step S202 with an automatic adjustment completion condition, that is, a threshold value "PRT_E". When it is smaller than "PRT_E", it performs the processing of Step S204, while when not, it performs processing of Step S205.

Step S204

The microcomputer 19 completes the processing by setting the central value "cents of the parameter used at Step S202 as a parameter "prt".

Step S205

The microcomputer 19 multiplies a predetermined gain "PRT_G" with the parameter error signal obtained at Step S202, adds the result to the central value "cent" of the parameter, substitutes the added result to the central value "cent", and returns to the processing of Step S202.

Next, the microcomputer 19 continues measuring by changing the central value "cent" of the parameter until the parameter error signal "mes" becomes less than the threshold value "PRT_E" at Step S203.

Note that the gain "PRT_G" may be subtracted at Step S205 as well. By doing so, it is possible to gradually decrease the gain to prevent the processing from being disturbed by noise.

Note that the above parameter may be generated before and while playing back the DVD 2. Also, it may be generated when the playback condition deteriorates.

Next, the overall operation of the DVD player 1 will be explained with reference to FIG. 2.

First, the DVD 2 is rotated driven by the spindle motor 10 under the control of the servo controller 12. A signal read from the DVD 2 by the optical pickup 13 is then output to the RF amplifier 14. The read signal is amplified by the RF amplifier 14 and output to the AD converter 15 as an RF signal S14a.

The RF signal S14a is converted to a digital reproduction signal S15 in the AD converter 15 and output as a reproduction signal S15 to the 8 to 16 demodulator 16.

The reproduction signal S15 is subjected to 8 to 16 demodulation in the 8 to 16 demodulator 16.

Then, the demodulated reproduction signal S16 is, as explained above, stored in the buffer memory 18, then corrected for error in units of ECC blocks in the error correction portion 171 of the error corrector 17 shown in FIG. 3 to generate a reproduction signal S17.

Also, in the error correction portion 171, as explained above, the PI(1) error correction completion byte detection signal S171a1, PI(1) error correction inability code block detection signal S171a2, PO error correction completion byte detection signal S171a3, PO error correction inability code block detection signal S171a4, PI(2) error correction completion byte detection signal S171a5, and PI(2) error correction inability code block detection signal S171a6 are generated.

Next, the pulses included in the detection signals S171a1 to 171a6 are counted in the counters 1721 to 1726. The counts are stored in the registers 1731 to 1736 and then output as the error correction evaluation signal S17a to the microcomputer 19.

Next, an error rate is calculated by using the error correction evaluation signal S17a in the microcomputer 19, a bias of a focus error signal is determined in order to suppress defocusing based on the calculated error rate, and a parameter instruction signal S19a indicating the bias is output to the servo controller 12.

In the servo controller 12, a focus servo signal is generated based on the parameter instruction signal S19a from the microcomputer 19 and a focus error signal S40 from the servo filter 40, and the generated focus servo signal S12a is output to the optical pickup 13.

As a result, focus control is performed to suppress defocusing in the optical pickup 13.

On the other hand, an error corrected reproduction signal S17 output from the error corrector 17 to the stream demultiplexer 20 is demultiplexed to a sub-picture signal S20a, a video signal S20b, and an audio signal S20c which are output respectively to the sub-picture decoder 21, MEG decoder 22, and audio decoder 23.

Next, the sub-picture signal S20a is decoded in the sub-picture decoder 21, and the decoded sub-picture signal S21 is output to the video mixer 28.

The video signal S20b is decoded in the MEG decoder 22, and the decoded video signal S22 is output to the video mixer 28.

The audio signal S20c is decoded in the audio decoder 23, and the decoded audio signal S23 is output to the DA converter 26.

The sub-picture signal S20a is mixed in the video mixer with the video signal S22, and the resultant mixed video signal S28 is output to the NTSC encoder 24.

Then, the video signal S28 is decoded by the NTSC system in the NTSC encoder 24, and the decoded video signal S24 is output to the DA converter 25.

The video signal S24 is converted to an analog video signal-S25 by the DA converter 25, and the video signal S25 is output to the display 30.

Also, the audio signal S23 is converted to an analog audio signal S26 in the DA converter 26, and the audio signal S26 is output to the speakers 31.

As explained above, according to the DVD player 1, a focus servo signal S12a is generated and the optical pickup 13 is controlled in order to suppress defocusing based on the error rate obtained at the time of the error correction of the reproduction signal of the DVD 2.

Therefore, even when the state of focus on the DVD 2 in the optical pickup 13 is poor, the DVD 2 can be accurately and stably played back due to the improvements.

Further, according to the DVD player 1, since the error correction evaluation signal S17a is generated in the error corrector 17, the load on the microcomputer 19 can be reduced.

Also, according to the DVD player 1, as shown in FIG. 3, by limiting the registers which the microcomputer 19 accesses to the register 1731 among the registers 1731 to 1736 in the error corrector 17, the overhead of register access by the microcomputer 19 can be reduced.

Second Embodiment

Figure 8:
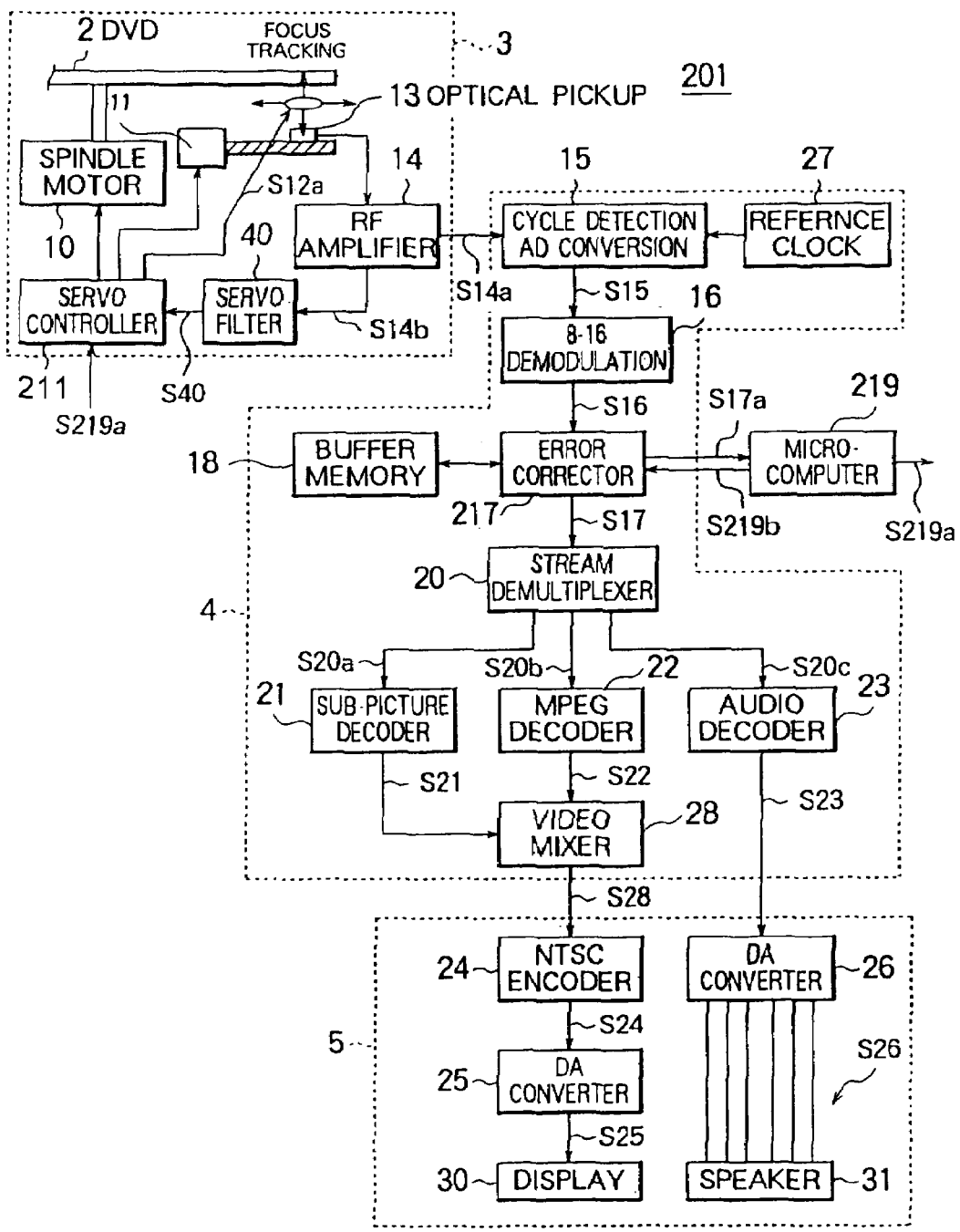
FIG. 8 is a view of the configuration of a DVD player according to a second embodiment of the present invention.

FIG. 8 is a view of the configuration of a DVD player 201 according to a second embodiment of the present invention.

In FIG. 8, components having the same reference numerals as in FIG. 2 are the same as those explained in the first embodiment.

Namely, the DVD player 201 is characterized by its servo controller 212, error corrector 217, and microcomputer 219.

[Servo Controller 212]

The servo controller 211 controls the spindle motor 10, feed motor 11, and optical pickup 13.

In the present embodiment, the servo controller 211 controls the speed of the spindle motor 10 based on a spindle speed change instruction signal S219a from the microcomputer 19.

[Error Corrector 217]

Figure 9:
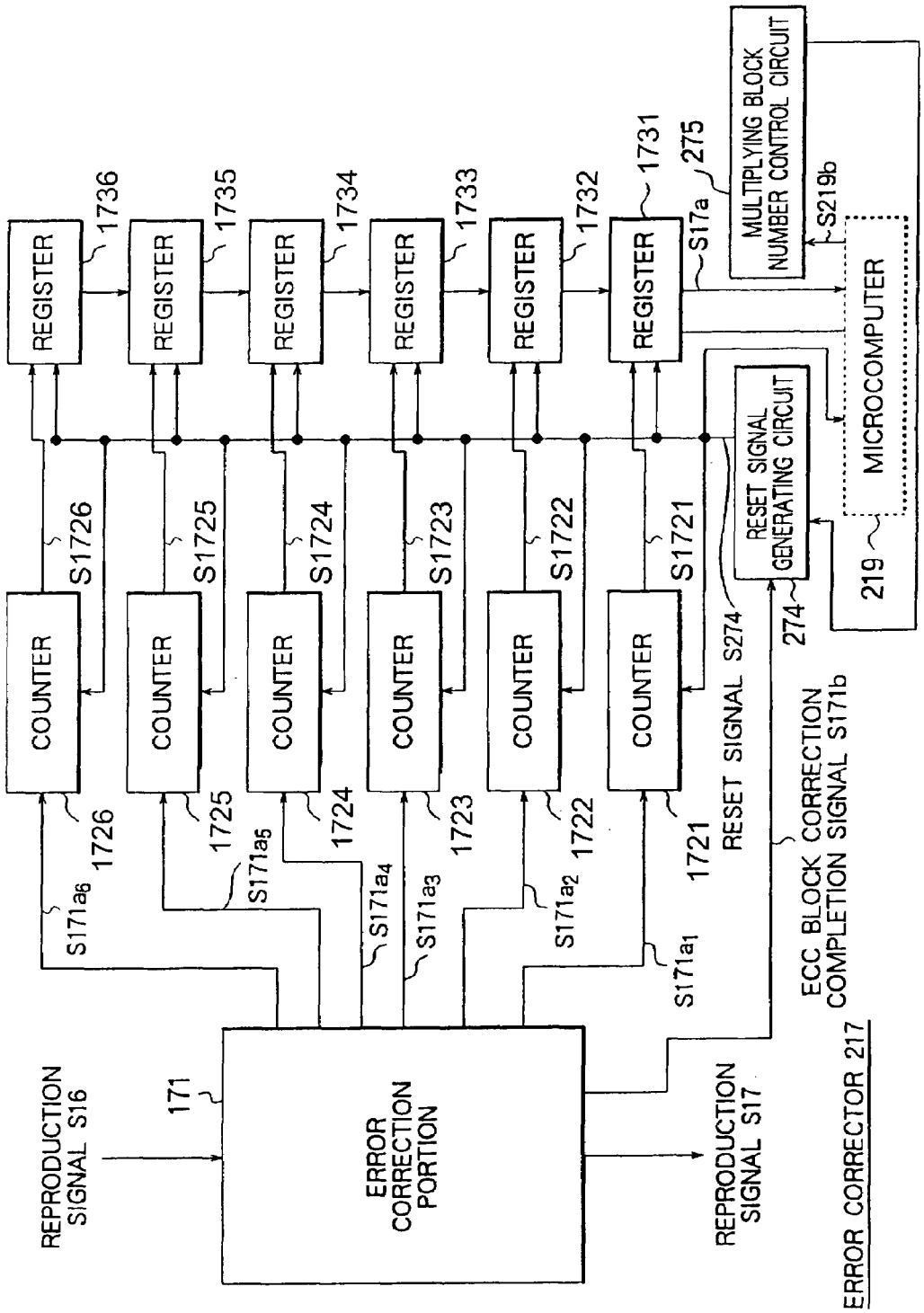
FIG. 9 is a view of the configuration of an error corrector shown in FIG. 8.

FIG. 9 is a view of the configuration of the error corrector 217.

In FIG. 9, components having the same reference numerals as in FIG. 3 are the same as in the error corrector 17 explained in the first embodiment.

As shown in FIG. 9, the error corrector 217 comprises an error correction portion 171, counters 1721 to 1726, registers 1731 to 1736, a reset signal generation circuit 274, and a cumulative block number control circuit 275.

Here, in the error corrector 217, the error correction portion 171, the counters 1721 to 1726, and the registers 1731 to 1736 are the same as those explained in the first embodiment.

The cumulative block number control circuit 275 changes the cumulative number of blocks set in the reset signal generation circuit 274 in accordance with a cumulative block number change signal S219b from the microcomputer 219.

The reset signal generation circuit 274 counts the pulses Included in the ECC block correction completion signal S171b and, when the count reaches the cumulative number of blocks, generates a pulse in the reset signal S274 to reset the count. The reset signal generation circuit 274 outputs the reset signal S274 to the counters 1721 to 1726, registers 1731 to 1736, and the microcomputer 219.

Also, the reset signal generation circuit 274 changes the cumulative number of blocks under the control of the cumulative block number control circuit 275.

[Microcomputer 219]

The microcomputer 219 uses an error correction evaluation signal S17a from the error corrector 217 to calculate the error rate and generates a spindle speed change instruction signal S219a for instructing a change of the speed of the spindle motor 10 based on the calculated error rate.

Figure 10:
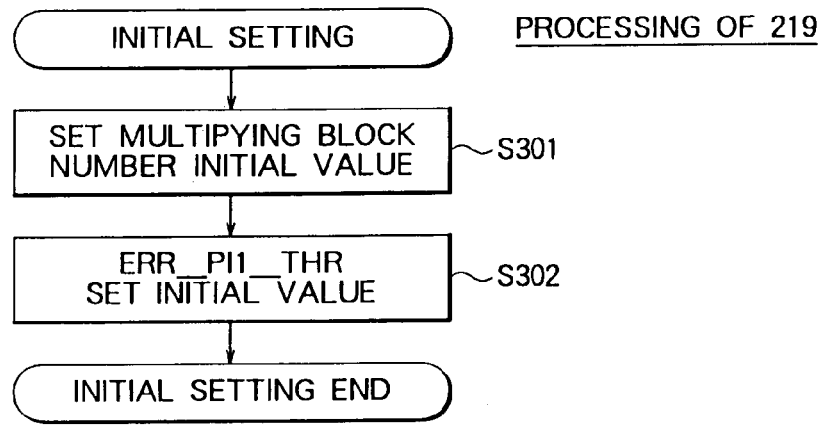
FIG. 10 is a flow chart of the processing for initialization of the microcomputer shown in FIG. 8.

FIG. 10 is a flow chart of the processing for initialization of the microcomputer 219.

Step S301: The microcomputer 219 sets an initial value for the cumulative number of blocks.

Step S302: The microcomputer 219 sets an initial value for the target error rate "ER_PI1_THR".

Figure 11:
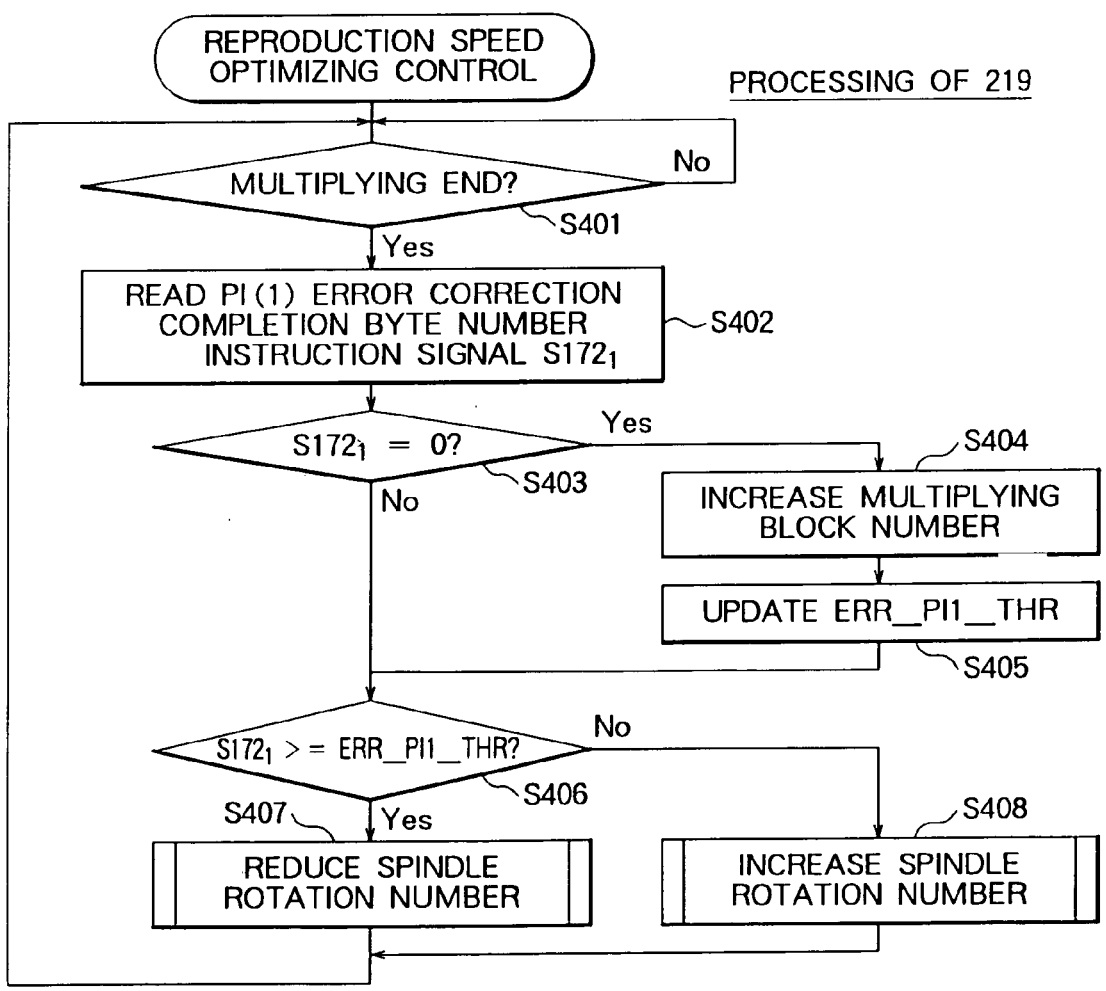
FIG. 11 is a flow chart of the processing for generation of a spindle speed changing instruction signal by the microcomputer shown in FIG. 8.

FIG. 11 is a flow chart of the processing for generation of a spindle speed change instruction signal S219a by the microcomputer 219.

The processing shown in FIG. 11 is carried out after completing the initialization shown in FIG. 10.

Step S401

The microcomputer 219 judges whether or not the cumulative addition in the error corrector 217 is completed, for example, based on the reset signal S274 from the reset signal generation circuit 274. When it is judged to be completed, it carries out the processing of Step S402, while when not, it repeats the processing of Step S401.

At this time, processing is performed for cumulative addition of the number of bytes for which error correction is completed and number of code blocks for which error correction was not possible for the cumulative number of blocks's worth of ECC blocks set by the reset signal generation circuit 274 in the error corrector 217.

Step S402

The microcomputer 219 receives as input a PI(1) error correction completion byte number instruction signal S1721 as an error correction evaluation signal S17a.

Step S403

The microcomputer 219 judges whether the PI(1) number of bytes for which error correction was completed indicated by the PI(1) error correction completion byte number instruction signal S1721 input at Step S402 is 0 or not. When judged to be 0, it performs the processing of Step S404, while when not, it carries out the processing of Step S406.

Step S404

The microcomputer 219 outputs a cumulative block number change signal S219b indicating to increase the cumulative number of blocks to the cumulative block number control circuit 275.

The cumulative block number control circuit 275 increases the cumulative number of blocks set in the reset signal generation circuit 274 by exactly a predetermined number based on the cumulative block number change signal S219b.

Step S405

The microcomputer 219 updates the target error rate "ERR_PI1_THR" by a value according to the cumulative number of blocks increased at Step S404.

Step S406

The microcomputer 219 judges whether or not the PI(1) number of bytes for which error correction was completed indicated by the PI(1) error correction completion byte number instruction signal S1721 input at Step S402 is more than the target error rate "ERR_PI1_THR". When judged to be more than the target error rate "ERR_PI1_THR", it performs the processing of Step S407, while when judged to be smaller, it carries out the processing of Step S408.

Step S407

The microcomputer 219 outputs a spindle speed change instruction signal S219a for instructing a decrease of the speed of the spindle motor 10 to the servo controller 212.

As a result, the speed of the spindle motor decreases.

Step S408

The microcomputer 219 outputs a spindle speed change instruction signal S219a to instruct an increase of the speed of the spindle motor 10 to the servo controller 212.

As a result, the speed of the spindle motor 10 increases.

As explained above, according to the DVD player 201, the speed of the spindle motor 10 is controlled based on the error rate obtained at the time of the error correction of the reproduction signal of the DVD 2.

Namely, in the DVD player 201, by decreasing the speed of the spindle motor 10 when the error rate is more than the target error rate, the playback conditions are improved. In this case, when the speed of the spindle motor 10 is decreased, the transfer rate becomes lower, however, retries of the read operation due to a failure of reading data from the DVD 2 can be eliminated and the read time can be shortened.

Further, in the DVD player 201, by increasing the speed of the spindle motor when the error rate is smaller than the target error rate, the transfer rate can be made higher within a range able to obtain the target error rate.

Note that in the DVD player 201, a case was explained where the spindle speed change instruction signal S219a is generated by using only the PI(1) error correction completion byte number instruction signal S1721, however, it is also possible to use the instruction signals S1722 to S1726 by increasing the number of pulses generated in the reset signal S174.

In this case, by storing the instruction signals S1721 to S1726 in the order of importance from the registers 1731 to 1736, instruction signals of higher importance can be supplied at a higher priority compared with the instructions of a lower importance to the microcomputer 219 in accordance with the number of pulses included in the reset signal S274 from the reset signal generation circuit 274.

Note that the importances of the instruction signals S1721 to S1726 are determined, for example, based on the playback conditions.

Specifically, when the error rate is less than a predetermined value (when the playback conditions are good), since every count except for the PI(1) number of bytes for which error correction was completed becomes zero, the PI(1) error correction completion byte number instruction signal S1721 is made the most important. When the error rate exceeds the predetermined value (when the playback conditions are poor), the PO error correction completion byte number instruction signal S1723 is made the most important.

Further, other than determining the cumulative block number change signal S219b based on the instruction signals S1721 to S1726, the microcomputer 219 may determine the cumulative block number change signal S219b so as to decrease the cumulative number of blocks when the instantaneous error rate is important and so as to increase the cumulative number of blocks when an error rate average for a certain period is important.

Third Embodiment

Figure 12:
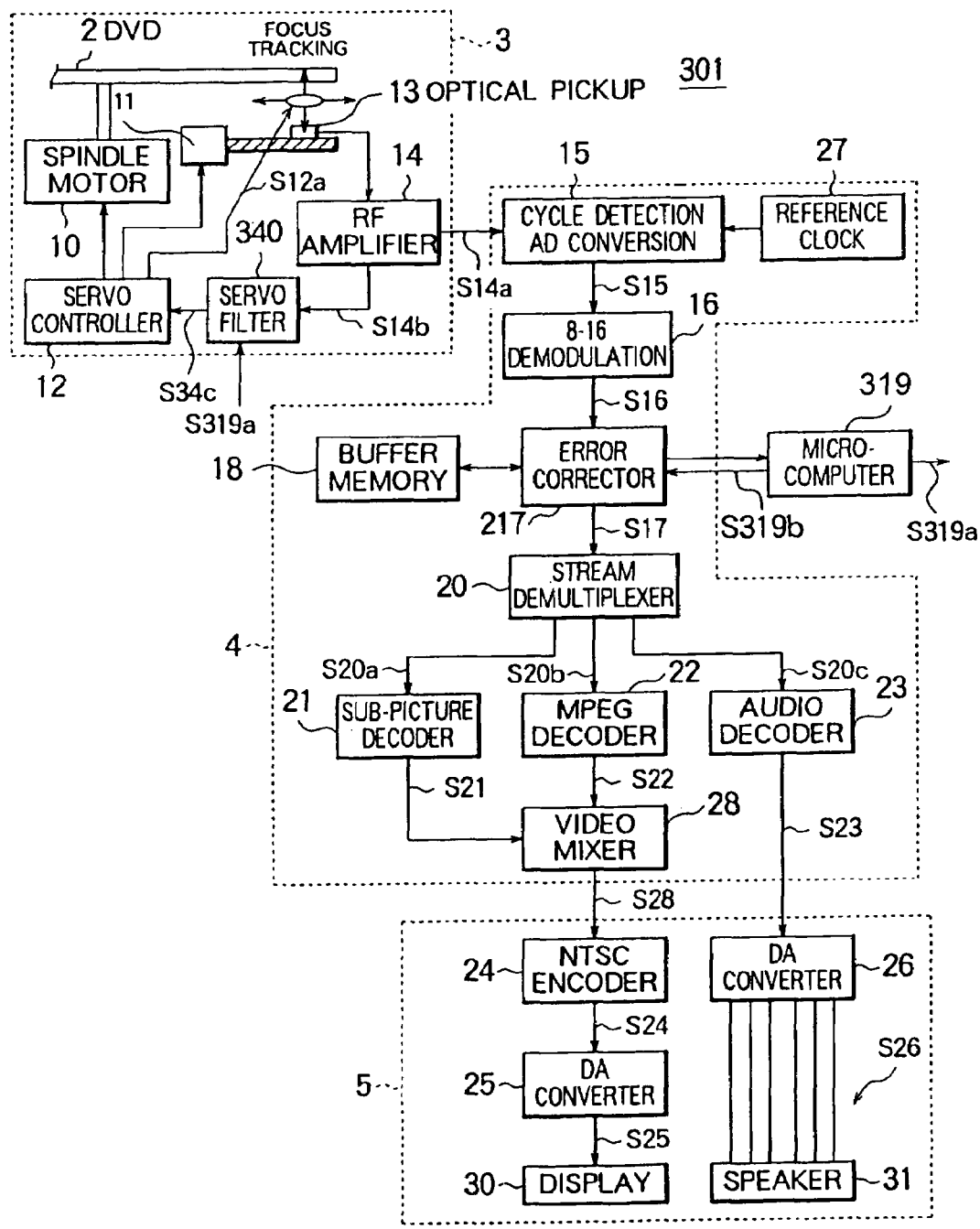
FIG. 12 is a view of the configuration of a DVD player according to a third embodiment of the present invention.

FIG. 12 is a view of the configuration of a DVD player 301 according to a third embodiment of the present invention.

In FIG. 12, components having the same reference numerals as in FIG. 2 and FIG. 8 are the same as those in the first and second embodiments.

Namely, the DVD player 301 is characterized in its servo filter 340 and microcomputer 319.

[Servo Filter 340]

The servo filter 340 filters the focus error signal S14b from the RF amplifier 14 by predetermined filter characteristics and outputs the filtered focus error signal S34c to the servo controller 12.

Note that, for example, a digital filter of a DSP is used as the servo filter 340. One set of filter characteristics is selected from filter characteristics for scratched disks and filter characteristics for scratch-free disks in accordance with a filter characteristic instruction signal S319a from the microcomputer 319 to filter the focus error signal, tracking error signal, etc. from the RF amplifier 14.

[Microcomputer 319]

The microcomputer 319 generates an error rate by using an error correction evaluation signal S17a from the error corrector 217 shown in FIG. 9 and generates a filter characteristic instruction signal S319a to instruct the filter characteristics of the servo filter 340 based on the generated error rate.

Figure 13:
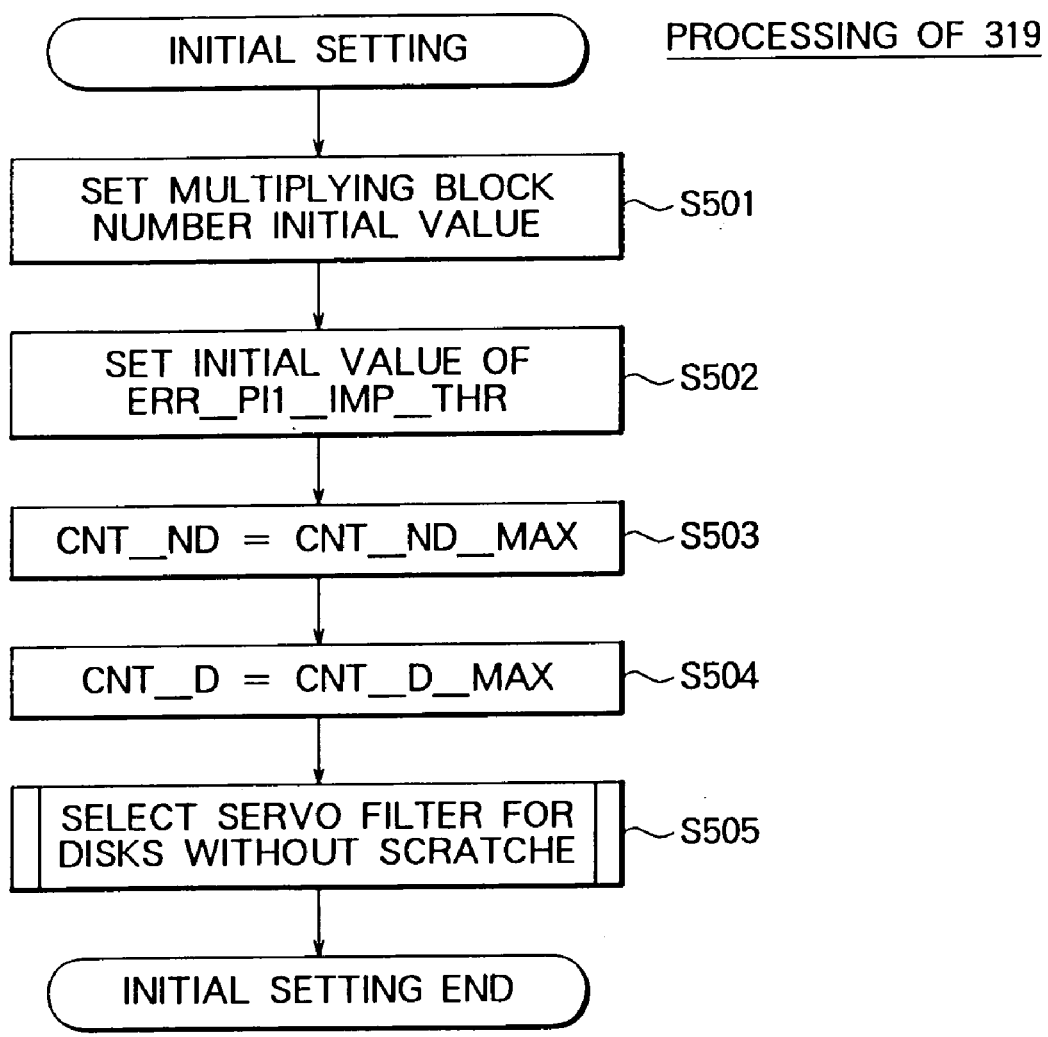
FIG. 13 is a flow chart of the processing for initialization of a microcomputer shown in FIG. 12.

FIG. 13 is a flow chart of the processing for initialization of the microcomputer 319.

Step S501

The microcomputer 319 sets an initial value for the cumulative number of blocks.

Step S502

The microcomputer 319 sets an initial value for the error rate "ER_PI1_IMP_THR".

Step S503

The microcomputer 319 sets an initial value "CNT_ND_MAX" for a scratch-free disk hysteresis "CNT_ND".

Step S504

The microcomputer 319 sets an initial value "CNT_D_MAX" for a scratched disk hysteresis "CNT_D".

Step S505

The microcomputer 319 outputs the filter characteristic instruction signal S319a to instruct selection of the filter characteristics for scratch-free disks to the servo filter 340.

As a result, the servo filter 340 filters the focus error signal S14b etc. from the RF amplifier 14 by the filter characteristics for scratch-free disks.

Figure 14:
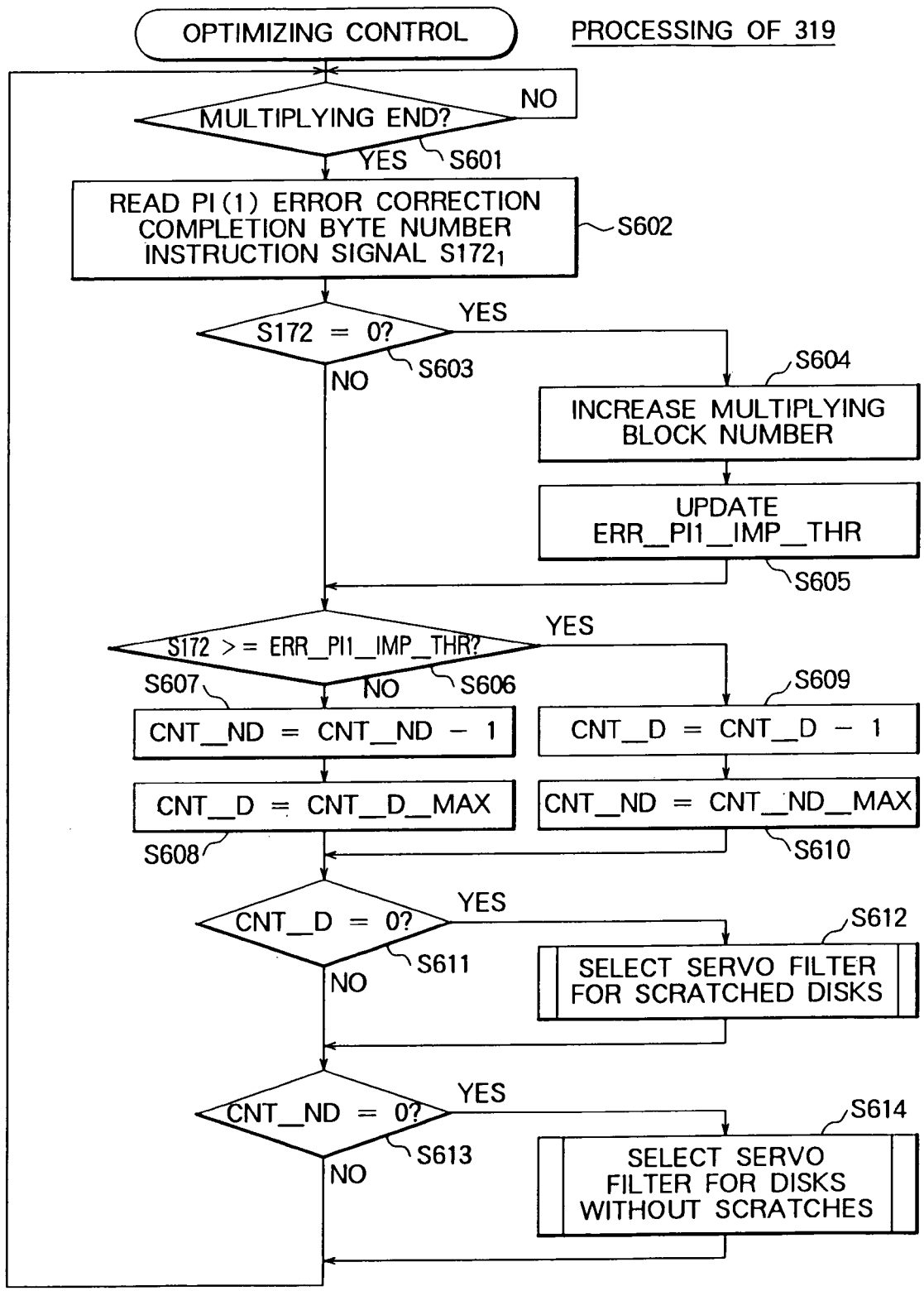
FIG. 14 is a flow chart of the processing for generation of a filter characteristic instruction signal by a microcomputer shown in FIG. 12.

FIG. 14 is a flow chart of the processing for generation of the filter characteristic instruction signal S319a by the microcomputer 319.

The processing shown in FIG. 14 is performed after completing the initialization shown in FIG. 13.

Step S601

The microcomputer 319 judges whether or not cumulative addition is completed in the error corrector 217 based on, for example, a reset signal S274 from the reset signal generation circuit 274. When it is judged to be completed, it carries out the processing of Step S602, while when not, it repeats the processing of Step S601.

At this time, in the error corrector 217, cumulative addition of the number of bytes for which error correction was completed and the number of code blocks for which error correction was not possible is performed for the cumulative number of blocks' worth of ECC blocks set in the reset signal generation circuit 274.

Step S602

The microcomputer 319 receives as input the PI(1) error correction completion byte number instruction signal S1721 as an error correction evaluation signal S17a.

Step S603

The microcomputer 319 Judges whether the PI(1) number of bytes for which error correction has been completed indicated by the PI(1) error correction completion byte number instruction signal S1721 input at Step S602 is 0 or not. When it is Judged to be 0, it carries out the processing of Step S604, while when not, it performs the processing of Step S606.

Step S604

The microcomputer 319 outputs a cumulative block number change signal S319b indicating to increase the cumulative number of blocks to the cumulative block number control circuit 275 of the error corrector 217.

The cumulative block number control circuit 275 increases the cumulative number of blocks set in the reset signal generation circuit 274 by exactly a predetermined number based on the cumulative block number change signal S319b.

Step S605

The microcomputer 319 updates the target error rate "ERR_PI1_IMP_THR" by a value according to the cumulative number of blocks increased at Step S604.

Step S606

The microcomputer 319 judges whether or not the PI(1) number of bytes for which error correction was completed indicated by the PI(1) error correction completion byte number instruction signal S1721 input at Step S602 is more than the target error rate "ERR_PI1_IMP_THR". When judged to be more than the aimed error rate "ERR_PI1_IMP_THR", it performs the processing of Step S609, when judged to be less than the target error rate "ERR_PI1_IMP_THR", it carries out the processing of Step S607.

Step S607

The microcomputer 319 subtracts exactly 1 from the value of the scratch-free disk hysteresis "CNT_ND".

Step S608

The microcomputer 319 sets an initial value "CNT_D_MAX" for the scratched disk hysteresis "CNT_D".

Step S609

The microcomputer 319 subtracts exactly 1 from the value of the scratched disk hysteresis "CNT_D".

Step S610

The microcomputer 319 sets an initial value "CNT_ND_MAX" for the scratch-free disk hysteresis "CNT_ND".

Step S611

The microcomputer 319 judges whether the scratched disk hysteresis "CNT_D" is 0 or not. When judged to be 0, it performs the processing of Step S612, when not, it performs the processing of Step S613.

Here, it is judged that the scratched disk hysteresis "CNT_D" is 0 when it is successively judged exactly for the times indicated by the initial value CNT_D_MAX" that the PI(1) number of bytes for which error correction has been completed is more than the target error rate "ERR_PI1_IMP_THR".

Step S612

The microcomputer 319 outputs a filter characteristic instruction signal S319a indicating selection of the filter characteristics for scratched disks to the servo filter 340.

As a result, the focus error signal S14b etc. from the RF amplifier 14 are filtered with the filter characteristics for scratched disks.

Step S613

The microcomputer 319 judges whether or not the scratch-free disk hysteresis "CNT_ND" is 0 or not. When judged to be 0, it performs the processing of Step S614, when not, it returns to the processing of Step S601.

Here, the scratch-free disk hysteresis CNT_D is judged to be 0 when it is successively judged exactly for the times indicated by the initial value "CNT_ND_MAX" that the PI(1) number of bytes for which error correction has been completed is smaller than the target error rate "ERR_PI1_IMP_THR" at Step S606.

Step S614

The microcomputer 319 outputs a filter characteristic instruction signal S319a indicating selection of the filter characteristics for scratch-free disks to the servo filter 340.

As a result, the focus error signal S14b etc. from the RF amplifier 14 are filtered with the filter characteristics for scratch-free disks.

As explained above, according to the DVD player 301, the filter characteristics of the servo filter 340 are controlled based on the error rate obtained at the time of performing error correction on the reproduction signal of the DVD 2.

Namely, in the DVD player 301, in the servo filter 340, the focus error signal etc. are filtered with the filter characteristics for scratched disks when the error rate is more than the target error rate, while the focus error signal etc. are filtered with the filter characteristics for scratch-free disks when the error rate is smaller than the target error rate.

Accordingly, a highly accurate focus error signal S34c etc. can be generated and the servo performance of the servo controller 12 can be improved.

Note that in the DVD player 301, a case was explained where the filter characteristic instruction signal S319a is generated by using only the PI(1) error correction completion byte number instruction signal S1721, however, instruction signals S1722 to 1726 may be used by increasing the number of pulse generated in the reset signal S174.

The present invention is not limited to the above embodiments.

For example, in the above embodiments, a case was explained of reproducing a digital signal recorded on a DVD 2 by a DVD player, however, the present invention can be applied to a case of recording a digital signal on a DVD 2 as well. In this case, a recording means is further added to the configuration shown in FIG. 2. After recording a digital signal on the DVD 2 by the recording means, the recorded digital signal is read from the DVD 2 in the same way as in the above first embodiment to obtain an error rate and the recording conditions of the recording means are controlled so that the error rate becomes smaller.

Figure 15:
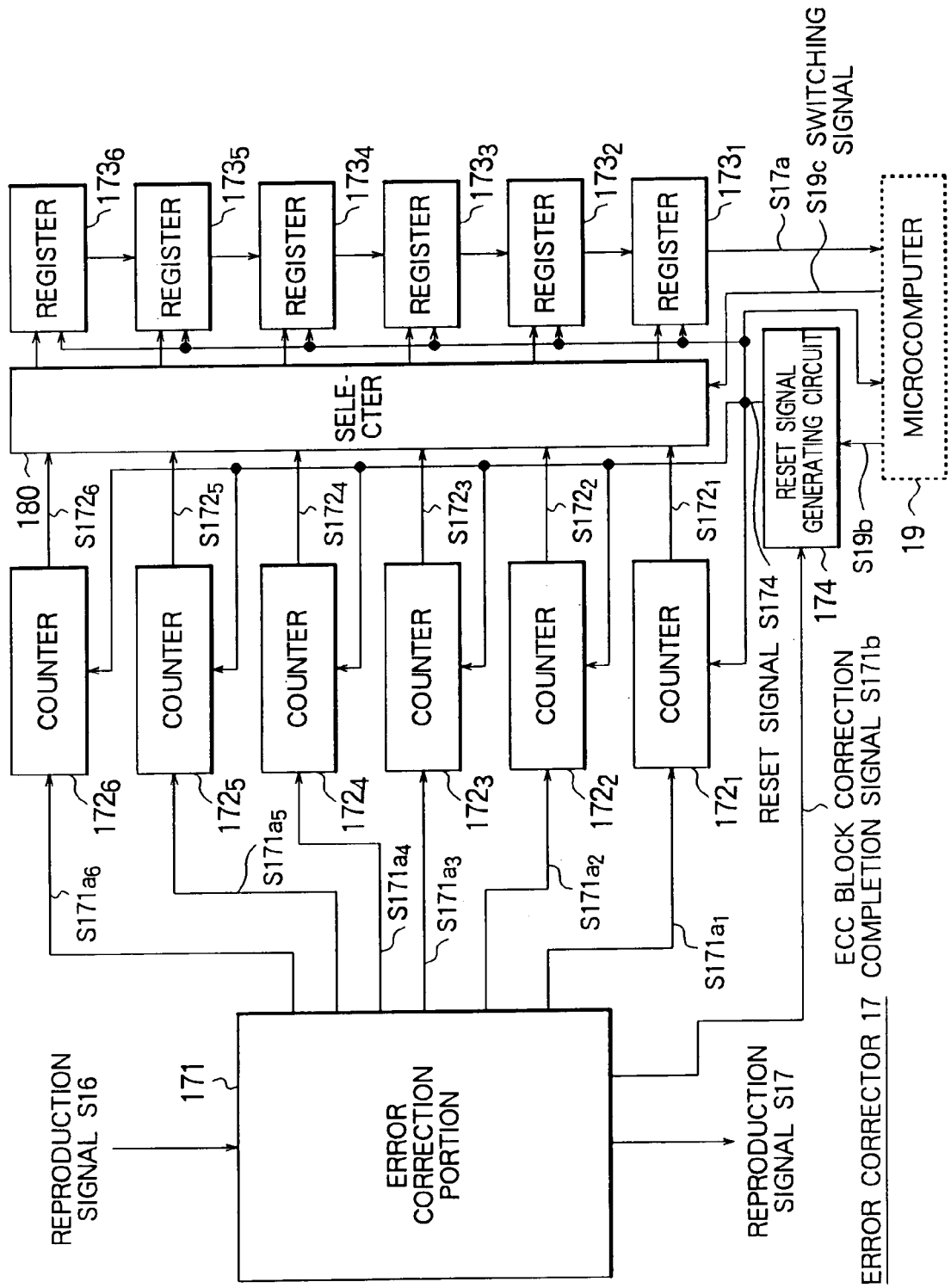
FIG. 15 is a view for explaining a modification of an error corrector shown in FIG. 13.

For example, in the above embodiments, as shown in FIG. 3, a case was explained where the instruction signals S1721 to S1726 from the counters 1721 to 1726 are output respectively to the registers 1731 to 1736, however, as shown in FIG. 15, by providing a selector 180 between the counters 1721 to 1726 and the registers 1731 to 1736, the instruction signals S1721 to S1726 may be output from the counters 1721 to 1726 to any registers 1731 to 1736 in accordance with a switching signal S19c from the microcomputer 19.

As a result, the PI(1) error correction completion byte detection signal S171a1, the PI(1) error correction inability code block detection signal S171a2, the PO error correction completion byte detection signal S171a3, the PO error correction inability code block detection signal S171a4, the PI(2) error correction completion byte detection signal S171a5, and the PI(2) error correction inability code block detection signal S171a6 can be output in any order as an error correction evaluation signal S17a to the microcomputer 19.

As a result, in the microcomputer 19, it becomes possible to generate an error rate by using any set of instruction signals among the instruction signals S1721 to S1726.

Also, in the above embodiments, a case was explained where PI(1) error correction, PO error correction, and PI(2) error correction are successively performed, however, the present invention can be applied to a variety of cases performing one or more of the PI error correction and PO error correction, such as successively performing PI error correction and PO error correction, performing only PI error correction, and performing only PO error correction.

Also, in the above embodiments, a case was explained of obtaining an error rate by using the above formula (I), however, the method of calculation of the error rate is not specifically limited as long as using at least one of the number of bytes of data wherein the error correction was correctly performed, the number of bytes of data wherein the error correction was not correctly performed, the number of code blocks wherein the error correction was correctly performed, and the number of blocks wherein the error correction was not correctly performed.

For example, by using a, b, c, d, e, and f used in equation (1), an error rate ER1 according to a and b, an error rate ER2 according to c and d, and an error rate ER3 according to e and f may be separately calculated. In this case, the playback conditions are controlled in accordance with a predetermined rule based on the error rates ER1, ER2, and ER3.

Also, in the above embodiments, a DVD was explained as a recording medium, however, the present invention can be applied to cases of playing back a compact disk, optomagnetic disk, etc.

Also, the object to be controlled by the microcomputer based on the error rate is not specifically limited as far as it is a parameter regarding reading, playback, and recording of a recording medium.

For example, the present invention may control the amount of light generated by a laser diode, the frequency of the signal superimposed on the signal applied to the laser diode, an amplitude of the signal superimposed on the signal applied to the laser diode, the gain of the photodiode, tracking condition, RF signal characteristics, inclination of the optical disk, and speed of the optical disk so that the error rate becomes smaller.

As explained above, according to the readout controlling apparatus and method of the present invention, data can be read from a recording medium stably and accurately (at a high quality).

Also, according to the player of the present invention, a recording medium can be played back stably and accurately.

Further, according to the recorder of the present invention, a recording medium can be recorded on stably and accurately.

While the invention has been described with reference to specific embodiment chosen for purpose of illustration, it should be apparent that numerous modifications could be made thereto by those skilled in the art without departing from the basic concept and scope of the invention.

What is claimed is:

1. A readout controlling apparatus for controlling reading conditions while reading data from a recording medium, comprising:

an error correcting means for correcting errors in said read data;

an error rate calculating means for calculating an error rate of said errors in said read data; and a control means for dynamically controlling and adjusting reading conditions;

wherein the control means performs a control operation so as to determine a parameter that makes an error rate smaller before or during playback of the recording medium, the control operation taking the current value of the parameter signal and applying a first new parameter signal which has been adjusted above said current value of the parameter signal, applying the first new parameter signal, and measuring the resultant error rate, and then applying a second new parameter signal adjusted below said current value of the parameter signal, applying the second new parameter signal, and measuring the resultant error rate, the control means finally applying the one of the first and the second new parameter signals that makes an error rate smaller.

2. A readout controlling apparatus as set forth in claim 1, wherein:
said data is coded in units of code blocks; and
said error correcting means corrects errors in said code blocks;
said error rate calculating means calculates said error rate by either determining a number of bytes of data in which said error correction was correctly carried out and a number of bytes of data in which said error correction was not correctly carried out, or a number of code blocks in which said error correction was correctly carried out, and a number of blocks wherein said error correction was not correctly carried out.

3. A readout controlling apparatus as set forth in claim 2, wherein
said error rate calculating means calculates said error rate by using either cumulative addition of the number of bytes of data in which said error correction was correctly carried out, and the number of bytes of data in which said error correction was not correctly carried out, or the number of code blocks in which said error correction was correctly carried out, and the number of blocks in which said error correction was not correctly carried out for at least one code block.

4. A readout controlling apparatus as set forth in claim 2, wherein:
said data comprises information arranged in rows and columns, and wherein an inner code parity is determined for the rows, and an outer code parity is determined for the columns and
said error correcting means performs inner code error correction using said inner code parity and outer code error correction using said outer code parity.

5. A readout controlling apparatus as set forth in claim 4, further comprising:
a memory means for storing the results of cumulative addition of said inner code error corrections and
a memory means for storing the results of cumulative addition of said outer code error corrections.

6. A readout controlling apparatus as set forth in claim 5, wherein said error rate calculating means reads the cumulative addition values stored in the memory means.

7. The readout controlling apparatus of claim 1, wherein the error correction means includes a plurality of registers and a plurality of counters with at least one reset signal generator, and
wherein the error correcting means employs a block number control circuit that changes a cumulative number of blocks based on a cumulative block number change signal.

8. The readout controlling method of claim 7, wherein the error correcting means includes a plurality of counters and registers with at least one reset signal generator, and
wherein the error correcting means employs a block number control circuit that changes a cumulative number of blocks based on a cumulative block number change signal.

9. The readout controlling method of claim 7, wherein the error correcting means includes a plurality of counters and registers with at least one reset signal generator, and
further comprising providing a selector electrically connected between the counters and registers.

10. The readout controlling apparatus of claim 1, wherein the error correcting means includes a plurality of counters and registers with at least one reset signal generator, and
the readout controlling apparatus further comprises a selector electrically connected between the counters and registers.

11. A readout controlling apparatus as set forth in claim 1, wherein:
the recording medium is an optical disk; and
the control means controls at least one of an amount of light of a laser diode, a frequency of a signal superimposed on a signal before being applied to a laser diode, a gain of a photodiode, filter characteristics, focus conditions, tracking conditions, RF signal characteristics, an inclination of the optical disk, a speed of the optical disk, and servo control of a spindle motor.

12. A recorder for recording data on a storage medium, comprising:
a reading means for reading recorded data;
an error correcting means for correcting errors in data read by the reading means;
an error rate calculating means for calculating an error rate; and
a control means for dynamically controlling and adjusting reading conditions:
wherein the control means performs a control operation so as to determine a parameter that makes an error rate smaller before or during playback of the recording medium, the control operation taking a current value of the parameter signal and applying a first new parameter signal which has been adjusted above said current value of the parameter signal, applying the first new parameter signal, and measuring the resultant error rate, and then applying a second new parameter signal adjusted below said current value of the parameter signal, applying the second new parameter signal, and measuring the resultant error rate, the control means applying the one of the first and the second new parameter signals that makes an error rate smaller.

13. The recorder for recording data of claim 12, wherein the error correcting means employs a block number control circuit that changes a cumulative number of blocks based on a cumulative block number change signal.

14. The recorder for recording data of claim 12, wherein the error correcting means includes a plurality of counters and registers with at least one reset signal generator and a selector electrically connected between the counters and registers.

15. A readout controlling method for controlling reading conditions while reading data from a recording medium comprising the steps of:
applying error correction to data read from the recording medium;
calculating an error rate of said error correction step; and
dynamically controlling and adjusting the reading conditions;
wherein the step of controlling and adjusting the reading conditions includes performing a control operation so as to determine a parameter that makes an error rate smaller before or during playback of the recording medium, the control operation taking the current value of the parameter signal and applying a first new parameter signal which has been adjusted above said current value of the parameter signal, applying the first new parameter signal and measuring the resultant error rate, and then applying a second new parameter signal adjusted below said current value of the parameter signal, applying the second new parameter signal, and measuring the resultant error rate, the control means finally applying the one of the first and the second new parameter signals that makes an error rate smaller.

16. A player, comprising:
reproducing means for reproducing data from a recording medium;
error correcting means for correcting error of said reproduced data;
error rate calculating means for calculating an error rate of said error correction; and
control means for controlling the reading conditions;
wherein the control means performs a control operation so as to determine a parameter that makes an error rate smaller before or during playback of the recording medium, the control operation taking the current value of the parameter signal and applying a first new parameter signal which has been adjusted above said current value of the parameter signal, applying the first new parameter signal, and measuring the resultant error rate, and then applying a second new parameter signal adjusted below said current value of the parameter signal, applying the second new parameter signal, and measuring the resultant error rate, the control means finally applying the one of the first and the second new parameter signals that makes an error rate smaller.

* * * * *